US011359655B2

(12) United States Patent
Sugiyama et al.

(10) Patent No.: US 11,359,655 B2
(45) Date of Patent: Jun. 14, 2022

(54) CLIPS

(71) Applicant: DAIWA KASEI KOGYO KABUSHIKI KAISHA, Okazaki (JP)

(72) Inventors: Takahiro Sugiyama, Okazaki (JP); Katsuya Hirakawa, Okazaki (JP)

(73) Assignee: DAIWA KASEI KOGYO KABUSHIKI KAISHA, Okazaki (JP)

( * ) Notice: Subject to any disclaimer, the term of this patent is extended or adjusted under 35 U.S.C. 154(b) by 13 days.

(21) Appl. No.: 17/126,897

(22) Filed: Dec. 18, 2020

(65) Prior Publication Data

US 2021/0199142 A1 Jul. 1, 2021

(30) Foreign Application Priority Data

Dec. 25, 2019 (JP) .............................. JP2019-234268

(51) Int. Cl.
  *F16B 2/22* (2006.01)
  *B65D 63/10* (2006.01)
  *B60R 16/02* (2006.01)

(52) U.S. Cl.
  CPC ............ *F16B 2/22* (2013.01); *B60R 16/0215* (2013.01); *B65D 63/1036* (2013.01)

(58) Field of Classification Search
  CPC ............ B60R 16/0215; B65D 63/1036; F16B 21/076; F16B 2/22; F16B 2/08; F16B 21/086; Y10T 24/1498; H02G 3/32
  See application file for complete search history.

(56) References Cited

U.S. PATENT DOCUMENTS

| | | | | |
|---|---|---|---|---|
| 10,008,843 B2* | 6/2018 | Yamamoto | ............... | H02G 3/32 |
| 10,099,628 B2* | 10/2018 | Kato | ..................... | F16B 21/086 |
| 10,131,291 B2* | 11/2018 | Ishida | ..................... | F16B 5/126 |
| 10,343,626 B2 | 7/2019 | Kamiya | .............. | B60R 16/0215 |
| 10,414,443 B2* | 9/2019 | Arima | ................ | B65D 63/1063 |
| 10,570,941 B2* | 2/2020 | Isaji | .......................... | F16B 2/22 |
| 10,634,180 B2* | 4/2020 | Sawada | ................. | F16B 21/084 |
| 10,666,034 B2* | 5/2020 | Tokunaga | ................ | H02G 3/32 |
| 10,737,643 B2* | 8/2020 | Kamiya | .............. | B65D 63/1027 |
| 11,052,838 B2* | 7/2021 | Iwahara | .............. | B60R 16/0215 |
| 11,052,839 B2* | 7/2021 | Iwahara | .............. | B60R 16/0215 |
| 11,059,434 B2* | 7/2021 | Iwahara | .................... | F16B 2/08 |
| 11,060,544 B2* | 7/2021 | Kawaguchi | ........... | F16B 5/0685 |

FOREIGN PATENT DOCUMENTS

JP 2006-292117 A 10/2006

* cited by examiner

*Primary Examiner* — Robert Sandy
*Assistant Examiner* — Louis A Mercado
(74) *Attorney, Agent, or Firm* — Christensen, Fonder, Dardi & Herbert PLLC

(57) ABSTRACT

A clip may include an attachment base, and an anchor including a pillar formed on the attachment base and a pair of engagement legs formed on the pillar. When the anchor is inserted into an attaching hole formed on an object member, the anchor is held in the attaching hole, so that the clip is attached to the panel. The clip further includes a rotation preventive mechanism that is configured to prevent the pillar from rotating relative to the attaching hole in a condition in which the anchor is held in the attaching hole. The rotation preventive mechanism includes a pair of projections formed on one end portion of the pillar, and at least one projection formed on another end portion of the pillar. The pair of projections formed on one end portion of the pillar respectively have through bores formed thereon.

6 Claims, 31 Drawing Sheets

CLIPS

CROSS-REFERENCE TO RELATED APPLICATIONS

This application claims priority to a Japanese Patent Application Ser. No. 2019-234268 filed Dec. 25, 2019, the contents of which are incorporated herein by reference.

BACKGROUND

The disclosure relates generally to a clip. More specifically, the disclosure relates to a clip composed of an attachment base to which an attaching article (e.g., an electric component such as a wiring harness) is attached, and an anchor including a pillar formed on the attachment base and a pair of engagement legs formed on the pillar.

A known clip is taught by, for example, Japanese Laid-Open Patent Publication No. 2006-292117 (JP2006-292117A). The clip taught by Japanese Laid-Open Patent Publication No. 2006-292117 is a cable tie 201 that is configured to attach a wiring harness (an attaching article) to a body panel (an objective member) of a vehicle. As shown in FIG. 29, the cable tie 201 is composed of an attachment base 210 to which the wiring harness (not shown) is attached, and an anchor 220. In particular, the attachment base 210 includes a stabilizer 215, a buckle (not shown) integrated with the stabilizer and a belt (not shown) connected to the buckle. Conversely, the anchor 220 includes a pillar 222 formed on the stabilizer 215 of the attachment base 210, and a pair of engagement legs 240 formed on the pillar 222.

In order to attach the wiring harness to the body panel 203 of the vehicle, first, the belt of the attachment base 210 is looped and wrapped around the wiring harness, so that the cable tie 201 is attached to the wiring harness. Thereafter, the anchor 220 is pressed into an attaching hole 203a formed on the body panel 203. As a result, the pillar 222 of the anchor 220 is inserted into the attaching hole 203a while the engagement legs 240 are flexed inward toward a base portion 222a of the pillar 222. When the pillar 222 is sufficiently inserted into the attaching hole 203a, the engagement legs 240 are restored outward, so that engagement claws 241 formed on the engagement legs 240 elastically engage an inner circumferential surface 203b of the attaching hole 203a while the stabilizer 215 of the attachment base 210 closely contact an outer surface of the body panel 203. As a result, the anchor 220 can be held in the attaching hole 203a with the panel 203 interleaved between the engagement legs 240 and the stabilizer 215 (FIG. 29). Thus, the cable tie 201 is attached to the panel 203. As a result, the wiring harness can be attached to the body panel 203 via the cable tie 201.

Generally, the pillar 222 is appropriately shaped so as to be prevented from excessively rotating within the attaching hole 203a when the pillar 222 (the anchor 220) is held in the attaching hole 203a. In particular, as shown in FIG. 30, a front end portion 225 of the pillar 222 (the base portion 222a) is widened and is configured to have a profile substantially corresponding to a shape of the inner circumferential surface 203b of the attaching hole 203a. Further, a rear end portion of the pillar 222 (the base portion 222a) is configured to have a profile substantially corresponding to the shape of the inner circumferential surface 203b of the attaching hole 203a. Therefore, the pillar 222 may be stably held in the attaching hole 203a in a condition in which the pillar 222 is substantially prevented from rotating relative to the attaching hole 203a. Further, a possible rotation angle $\theta$ of the pillar 222 (the anchor 220) relative to the attaching hole 203a may be a couple of degrees (e.g., 3 degrees or less), which are allowable angles.

Further, in order to increase engaging amounts (forces) of the engagement claws 241 of the engagement legs 240 against the inner circumferential surface 203b of the attaching hole 203a, the engagement legs 240 may be structurally changed. For example, the engagement legs 240 may be thickened. However, if the engagement legs 240 is thickened, when the anchor 220 (the pillar 222) is inserted into the attaching hole 203a, the engagement legs 240 may be largely flexed toward the base portion 222a of the pillar 222, so that distal ends 242 of the engagement legs 240 may interfere with the base portion 222a of the pillar 222 (FIG. 31). As a result, an insertion load of the anchor 220 into the attaching hole 203a may be relatively increased.

In order to reduce such an insertion load, the base portion 222a of the pillar 222 may be thinned in a range except for the front end portion 225 thereof, so as to prevent the engagement legs 240 from interfering with the base portion 222a of the pillar 222 when the anchor 220 is inserted into the attaching hole 203a. That is, a distance A (i.e., a thickness of the base portion 222a of the pillar 222) may be reduced (FIG. 30). However, when the distance A is reduced, the rear end portion 228 of the pillar 222 (the base portion 222a) may inevitably be thinned. Therefore, a contact area between the rear end portion 228 of the pillar 222 and the inner circumferential surface 230b of the attaching hole 203a may be reduced when the anchor 220 is held in the attaching hole 203a. As a result, the possible rotation angle $\theta$ of the pillar 222 relative to the attaching hole 203a may be relatively increased. In other words, an anti-rotation property of the anchor 220 in the attaching hole 203a may be reduced.

Alternatively, as shown by broken lines in FIG. 30, if the base portion 222a of the pillar 222 is partially reduced in thickness or thinned in a limited range between the front and rear portions 225 and 228 of the pillar 222 (i.e., if only a portion of the base portion 222a of the pillar 222 is reduced in thickness), the distal ends 242 of the engagement legs 240 may be prevented from interfering with the base portion 222a of the pillar 222 even when the engagement legs 240 are largely flexed. Further, in such a structure, the contact area between the rear end portion of the pillar 222 and the inner circumferential surface 203b of the attaching hole 203a may not be reduced when the anchor 220 is held in the attaching hole 203a. Therefore, the possible rotation angle $\theta$ of the pillar 222 relative to the attaching hole 203a may not be changed or increased. However, it is technically difficult to manufacture the cable tie 201 in which the base portion 222a of the pillar 222 is partially thinned between the front and rear portions 225 and 228 of the pillar 222. In particular, the cable tie 201 (the attachment base 210 and the anchor 220) may generally be manufactured by injection molding method using a molding die unit including a first die and a second die. However, the cable tie 201 in which the pillar 222 is modified described above cannot be easily manufactured by injection molding because the pillar 222 may include an undercut portion due to partial thinning of the base portion 222a of the pillar 222. Therefore, there is a need in the art for an improved clip.

SUMMARY

In one aspect of the present disclosure, a clip may include an attachment base to which an attaching article is attached, and an anchor including a pillar formed on the attachment base and a pair of engagement legs formed on the pillar, in which the clip is configured such that when the anchor is inserted into an attaching hole formed on an object member while the pair of engagement legs are flexed, the anchor is held in the attaching hole with the object member interleaved between the pair of flexed engagement legs and the attachment base, so that the attaching article is attached to the object member. The clip further comprises a rotation preventive mechanism that is configured to prevent the pillar from rotating relative to the attaching hole in a condition in which the anchor is held in the attaching hole. The rotation preventive mechanism includes a pair of projections formed on one end portion of the pillar and oppositely projected therefrom, and at least one projection formed on another end portion of the pillar. One end portion of the pillar has through bores respectively formed on the pair of projections formed thereon. The at least one projection formed on another end portion of the pillar is configured such that a distal end surface thereof does not extend outward beyond outermost inner surfaces of the through bores formed on the pair of projections formed on one end portion of the pillar.

According to this aspect, the pillar of the clip may be partially thinned without producing any undercut portions because the through bores are formed on one end portion of the pillar. That is, the pillar may be partially thinned in a limited range between one and another end portions of the pillar without producing any undercut portions. Therefore, the clip in which only a portion of the pillar (a portion except for one and another end portions of the pillar) is thinned may be easily manufactured by injection molding method using a molding die unit including a first die and a second die. As a result, even when the clip is manufactured by injection molding method, the pillar may be easily partially thinned without reducing an anti-rotation property of the anchor within the attaching hole.

Additional objects, features and advantages of the present disclosure will be readily understood after reading the following detailed description together with the accompanying drawings and the claims.

DETAILED DESCRIPTION

Detailed representative embodiments of the present disclosure are shown in FIGS. 1 to 28.

First Embodiment

In the following, a first embodiment will be described in detail with reference to FIGS. 1 to 14. Further, forward, backward, rightward, leftward, upward and downward directions described with reference to the figures may be defined simply for descriptive purposes.

Figure 1:
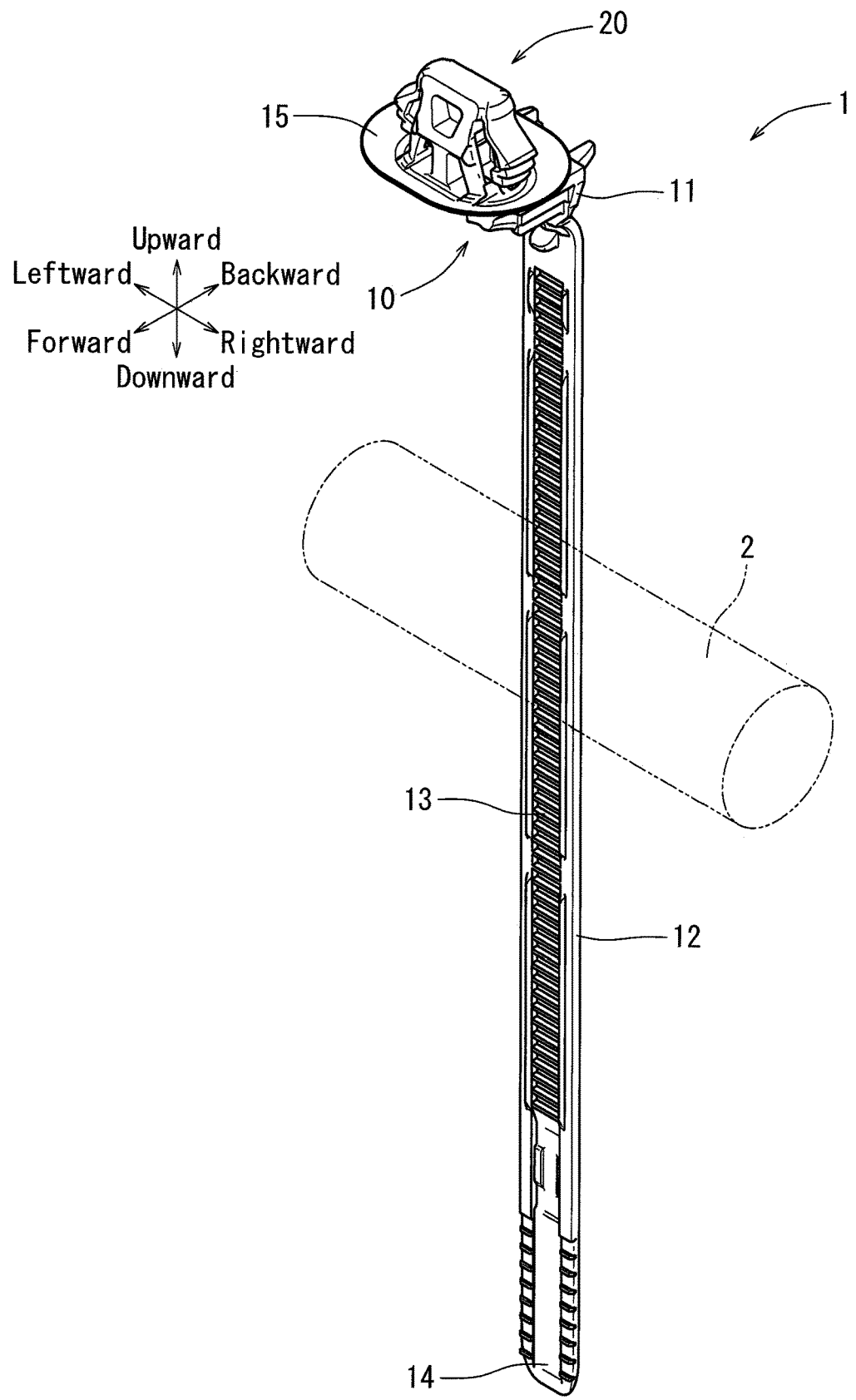
FIG. 1 is a front perspective view of a cable tie according to a first representative embodiment.
Figure 2:
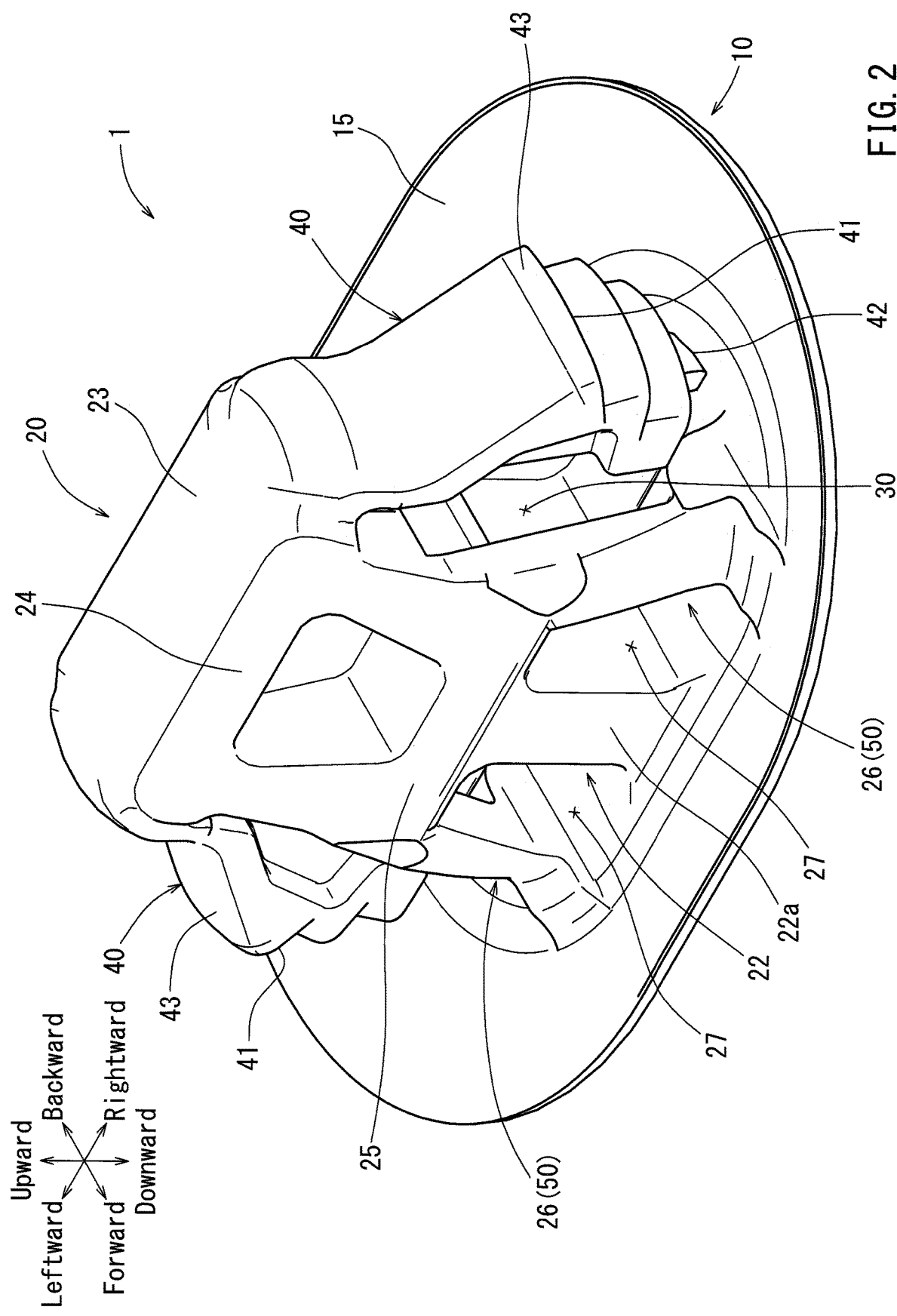
FIG. 2 is an enlarged front perspective view of an anchor and a stabilizer of the cable tie.
Figure 3:
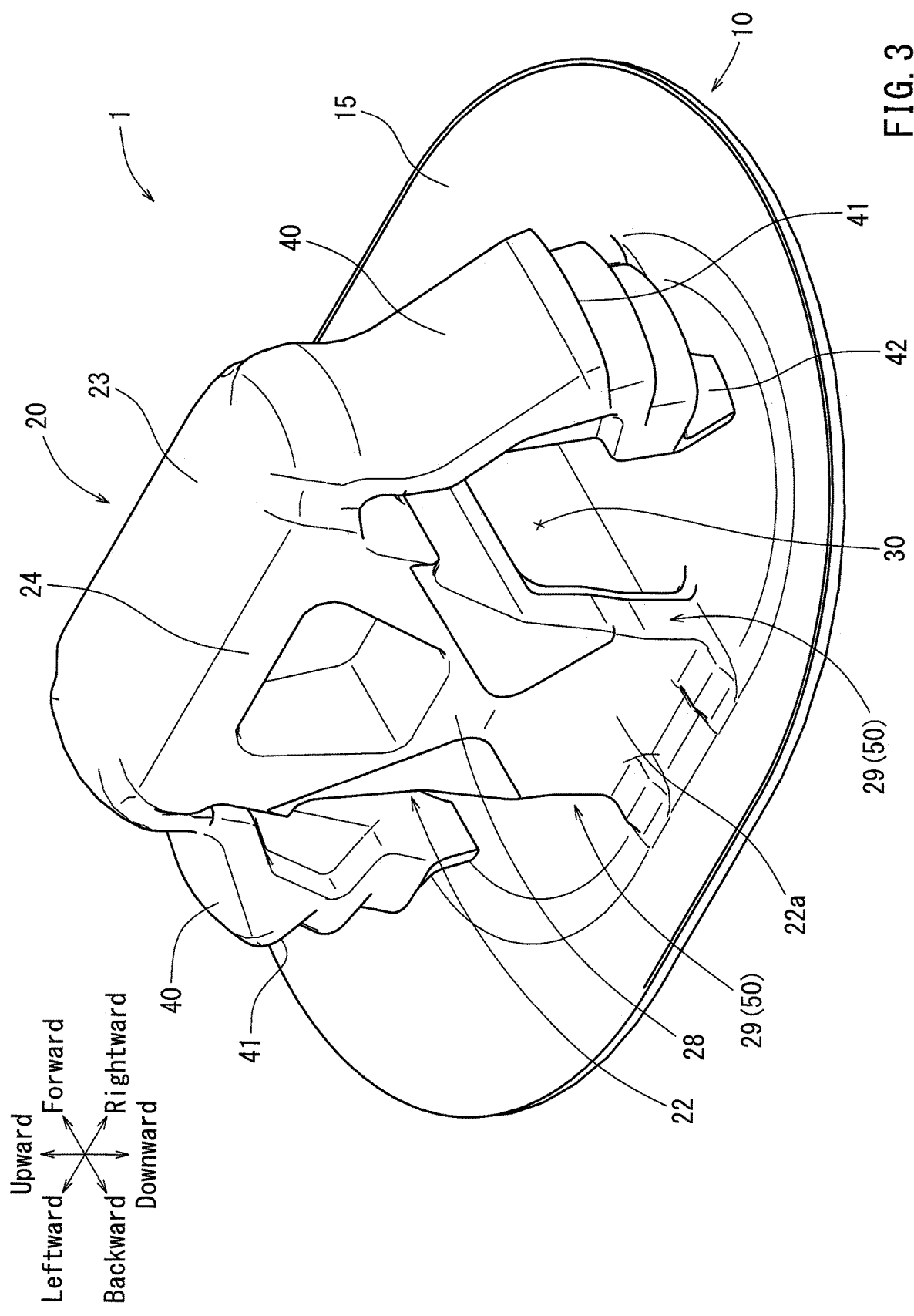
FIG. 3 is an enlarged rear perspective view of the anchor and the stabilizer of the cable tie.
Figure 4:
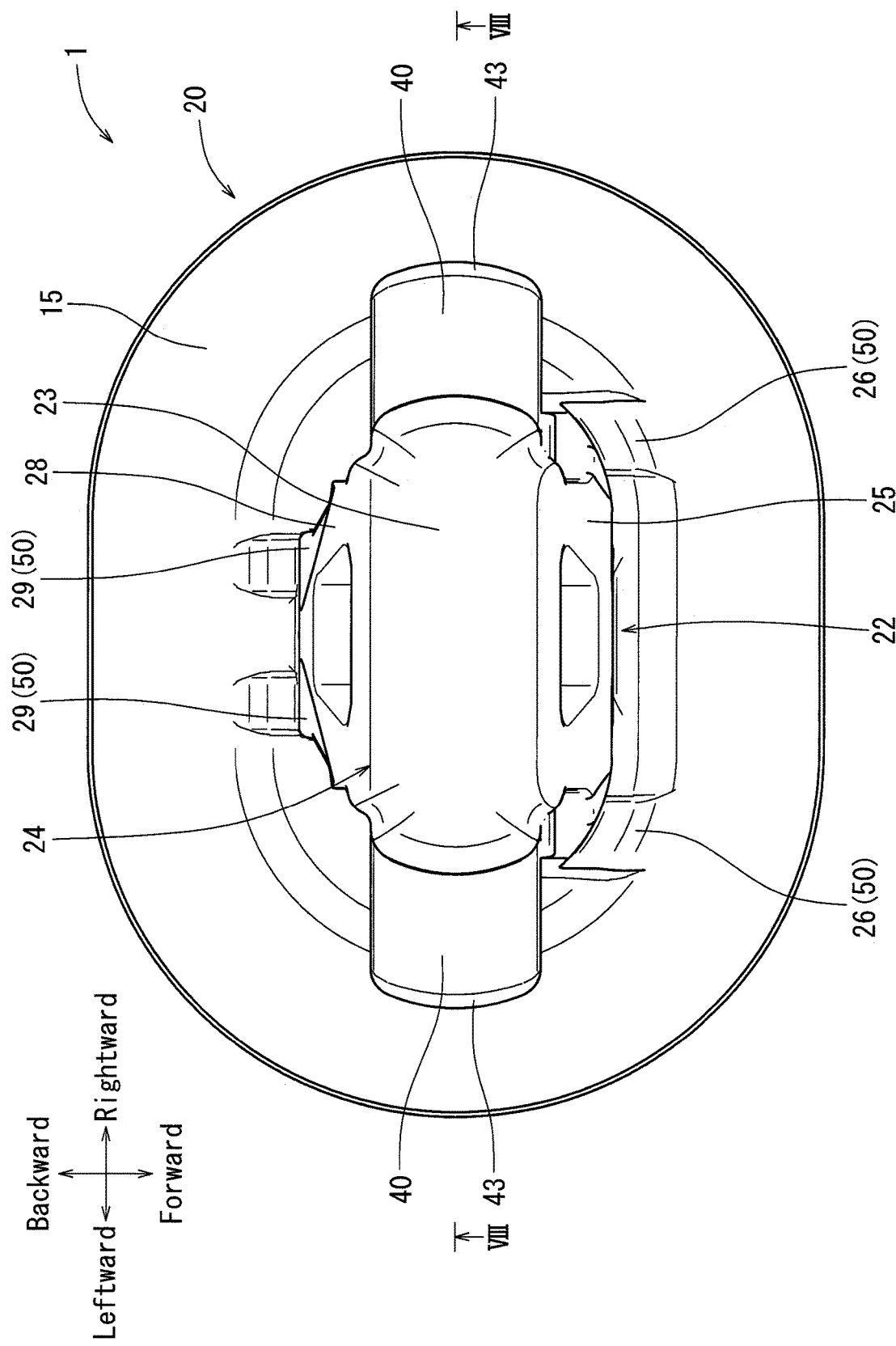
FIG. 4 is a plan view of FIG. 2.
Figure 5:
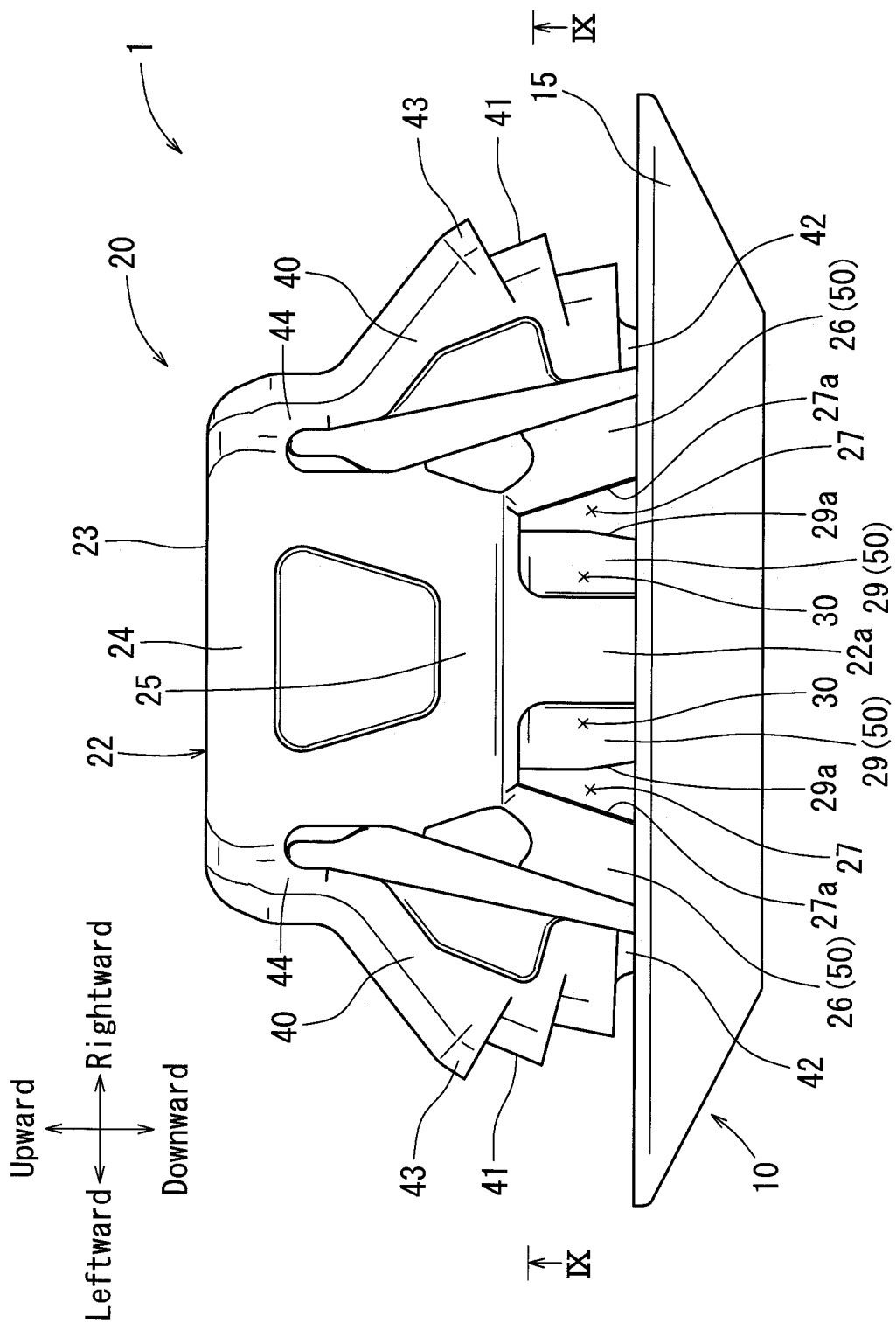
FIG. 5 is a front elevational view of FIG. 2.
Figure 6:
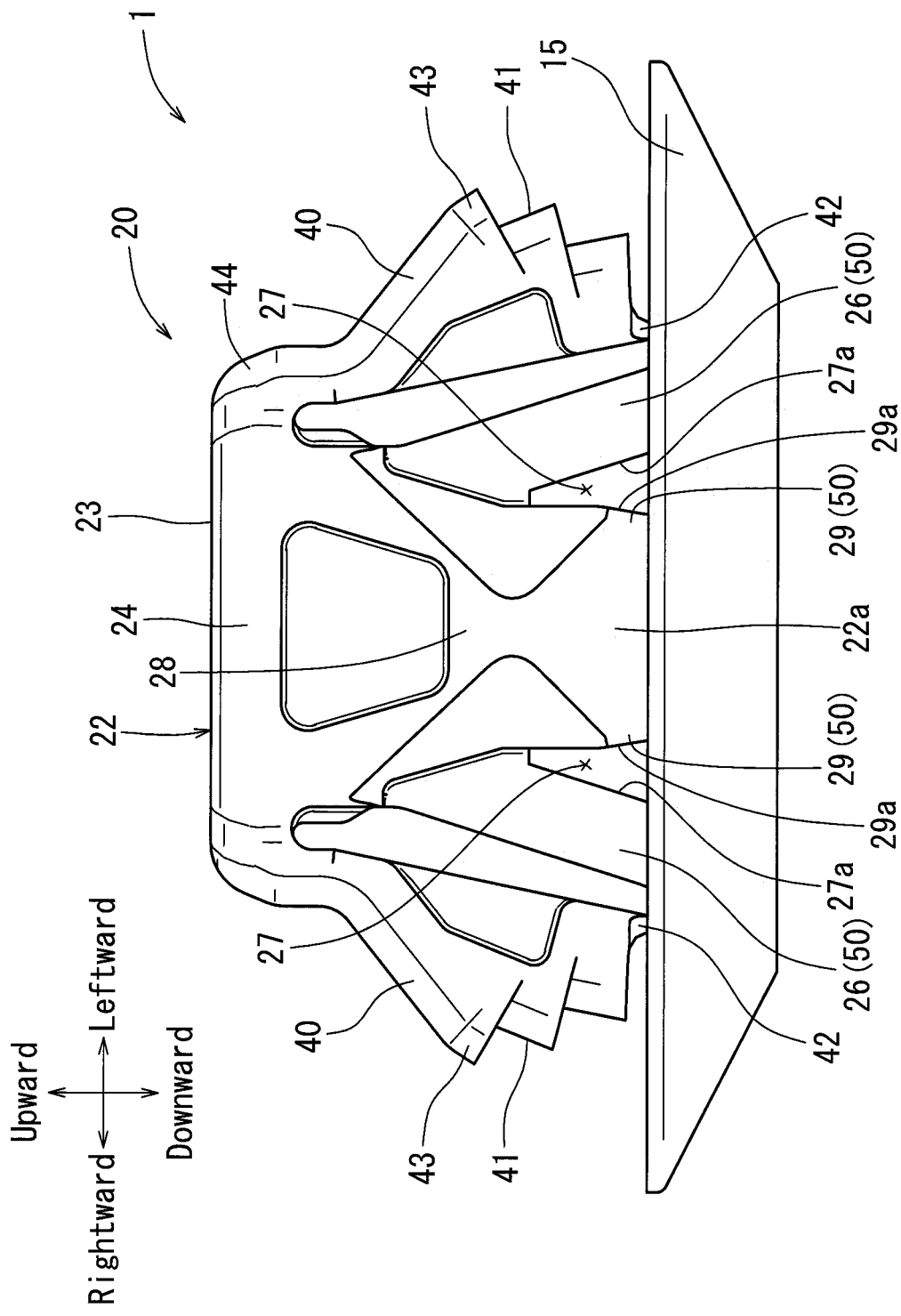
FIG. 6 is a rear elevational view of FIG. 2.
Figure 7:
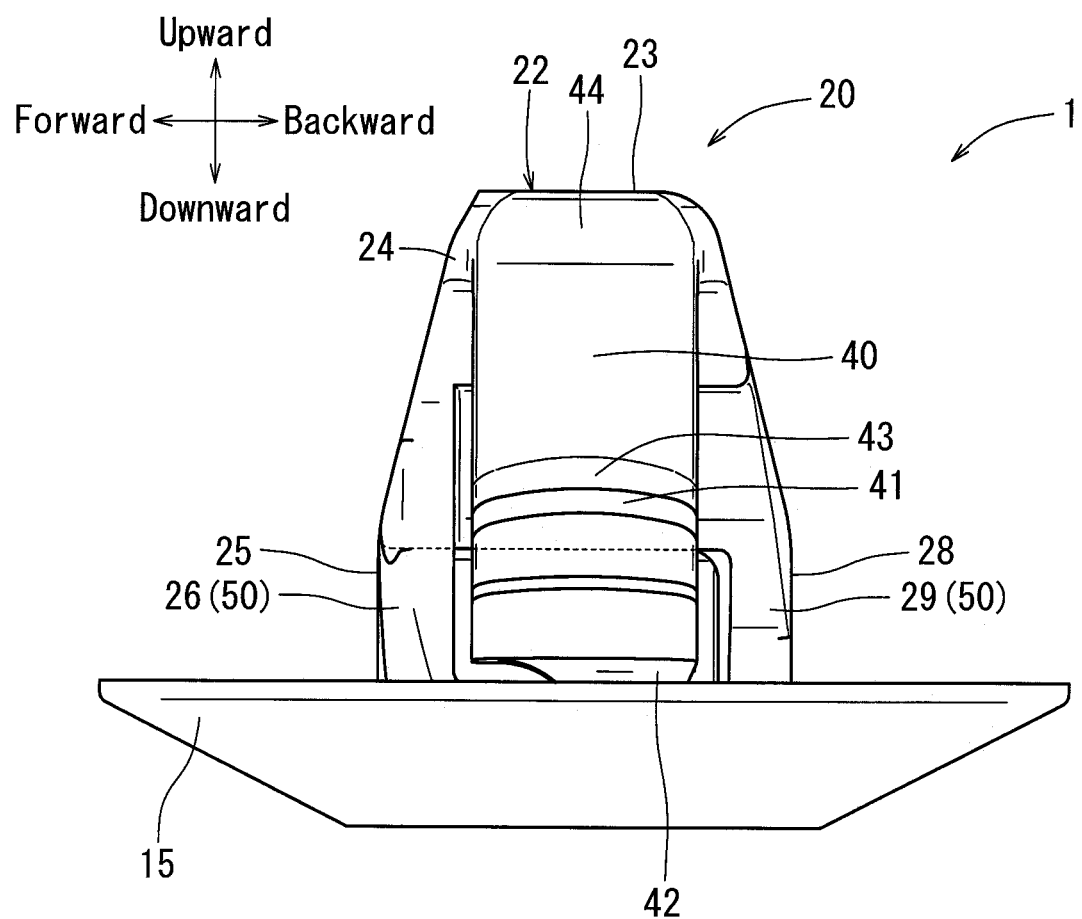
FIG. 7 is a right side view of FIG. 2.
Figure 8:
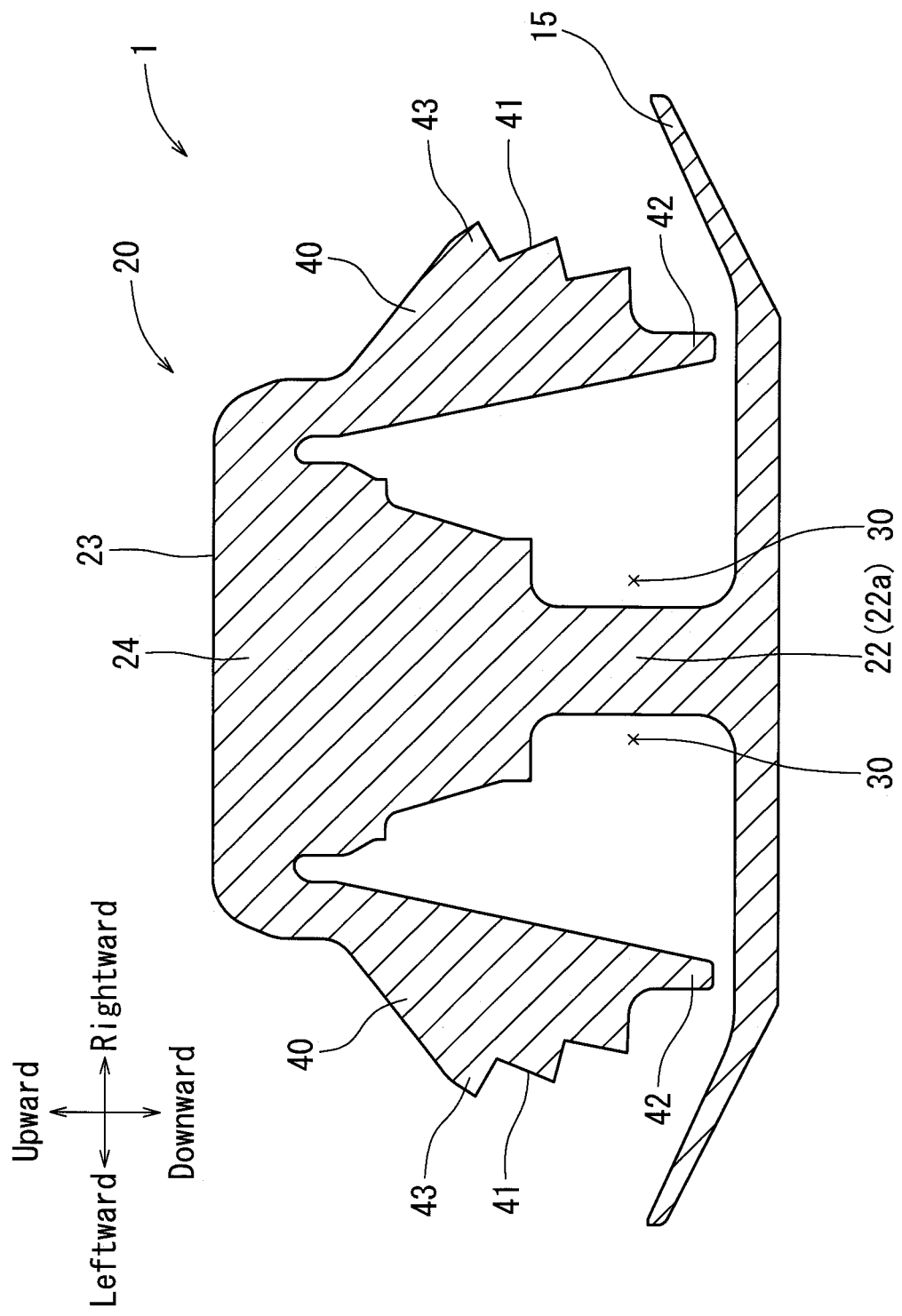
FIG. 8 is a cross-sectional view taken along line VIII-VIII in FIG. 4.

As shown in FIG. 1, a clip or cable tie 1 according to the first embodiment may be used to attach a wiring harness 2 (which may be referred to as an attaching article) to a panel 3 (which may be referred to as an object member) having an attaching hole 3a formed thereon (FIGS. 11 to 14). The cable tie 1 may preferably be integrally formed as a unit by injection molding of synthetic resins, e.g., polypropylene (PP).

As shown in FIG. 1, the cable tie 1 may include an attachment base 10 to which the wiring harness 2 is attached, and an anchor 20. The attachment base 10 may includes a buckle 11, a desired length of flexible belt 12, and a dish-shaped elastic stabilizer 15 formed on the buckle 11. The buckle 11 may have a through hole (not shown) into which the belt 12 is inserted, and an engagement strip (not shown) formed in the through hole and having engagement claws (not shown). The belt 12 may be integrally connected to the buckle 11 at a proximal end thereof. Further, the belt 12 may have a plurality of engagement teeth or rack teeth 13 that are formed in one (inner) surface thereof. The rack teeth 13 may preferably be arranged at a constant pitch distance in a longitudinal direction of the belt 12.

In order to attach the cable tie 1 to the wiring harness 2, the belt 12 may be looped and wrapped around an outer circumferential surface of the wiring harness 2. Thereafter, the belt 12 may be inserted into the through hole of the buckle 11 and may then be tightened by pulling a distal end 14 thereof. At this time, one of the engagement claws of the engagement strip of the buckle 11 can engage any of the rack teeth 13 of the belt 12, so that the belt 12 can be held in loop shape. As a result, the wiring harness 2 may be clamped by the belt 12. Thus, the cable tie 1 may be attached to the wiring harness 2.

Figure 9:
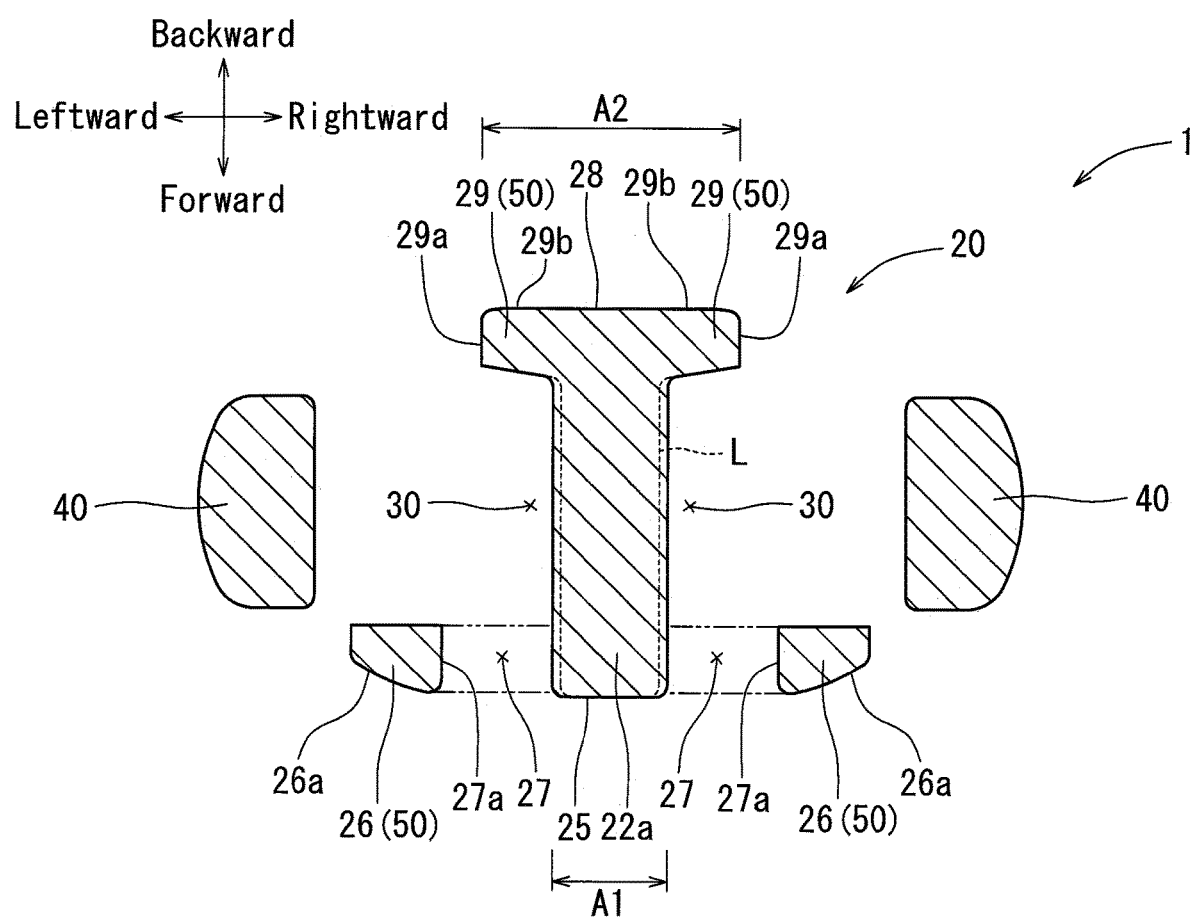
FIG. 9 is a cross-sectional view taken along line IX-IX in FIG. 5.

As shown in FIGS. 2 to 9, the anchor 20 may include a pillar 22 formed on a central portion of the stabilizer 15 of the attachment base 10, and a pair of (right and left) flexible engagement legs 40 formed on the pillar 22. In particular, the pillar 22 may have an upper block-shaped hollow head 24 defining a distal (upper) end 23 thereof, and a base portion 22a connected to the stabilizer 15. The engagement legs 40 may respectively extend obliquely outward and downward from right and left sides of the head 24 toward the stabilizer 15. As shown in FIG. 9, the pillar 22 may have a substantially I-shape in transverse cross section. In particular, the pillar 22 may include a pair of front lateral projections (overhanging portions) 26 formed on a front end portion 25 thereof and laterally oppositely (rightward and leftward) projected, and a pair of rear lateral projections (overhanging portions) 29 formed on a rear end portion 28 thereof and laterally oppositely (rightward and leftward) projected. Further, the front and rear lateral projections 26 and 29 may be referred to as a rotation preventive mechanism 50.

The front end portion 25 of the pillar 22 may have a pair of substantially rectangular through bores 27 that are respectively formed on the front lateral projections 26, so as to extend along the base portion 22a of the pillar 22 toward the rear lateral projections in a front-back direction. Further, the front lateral projections 26 may respectively have outer chamfered edges 26a formed on their distal end portions. Conversely, the rear lateral projections 29 of the pillar 22 may respectively have distal end surfaces 29a and outer (rear) surfaces 29b. Further, the rear lateral projections 29 may respectively have a length smaller than the front lateral projections 26. In particular, the rear lateral projections 29 may respectively be configured such that the distal end surfaces 29a do not laterally extend outward beyond laterally outermost inner surfaces 27a of the through bores 27 formed on the front lateral projections 26.

As described above, the pillar 22 may have the I-shape in transverse cross section because of the front and rear lateral projections 26 and 29 formed thereon. As a result, the pillar 22 may have right and left concave portions 30 formed on the base portion 22a thereof. The concave portions 30 may be referred to as engagement leg receiving portions.

As shown in FIGS. 2 to 9, the engagement legs 40 may preferably be formed as cantilevered strips and configured to be elastically deformed or flexed laterally (toward and away from the pillar 22) about proximal (upper) ends 44 thereof.

The engagement legs 40 may respectively have free or distal (lower) ends 42. Further, the engagement legs 40 may respectively have bulged portions 43 that are positioned between the proximal and distal ends 42 and 44 and are most projected outward. Further, the engagement legs 40 may respectively have multiple (three in this embodiment) stair-like engagement claws 41 that are positioned between the bulged portions 43 and the distal ends 42.

Figure 10:
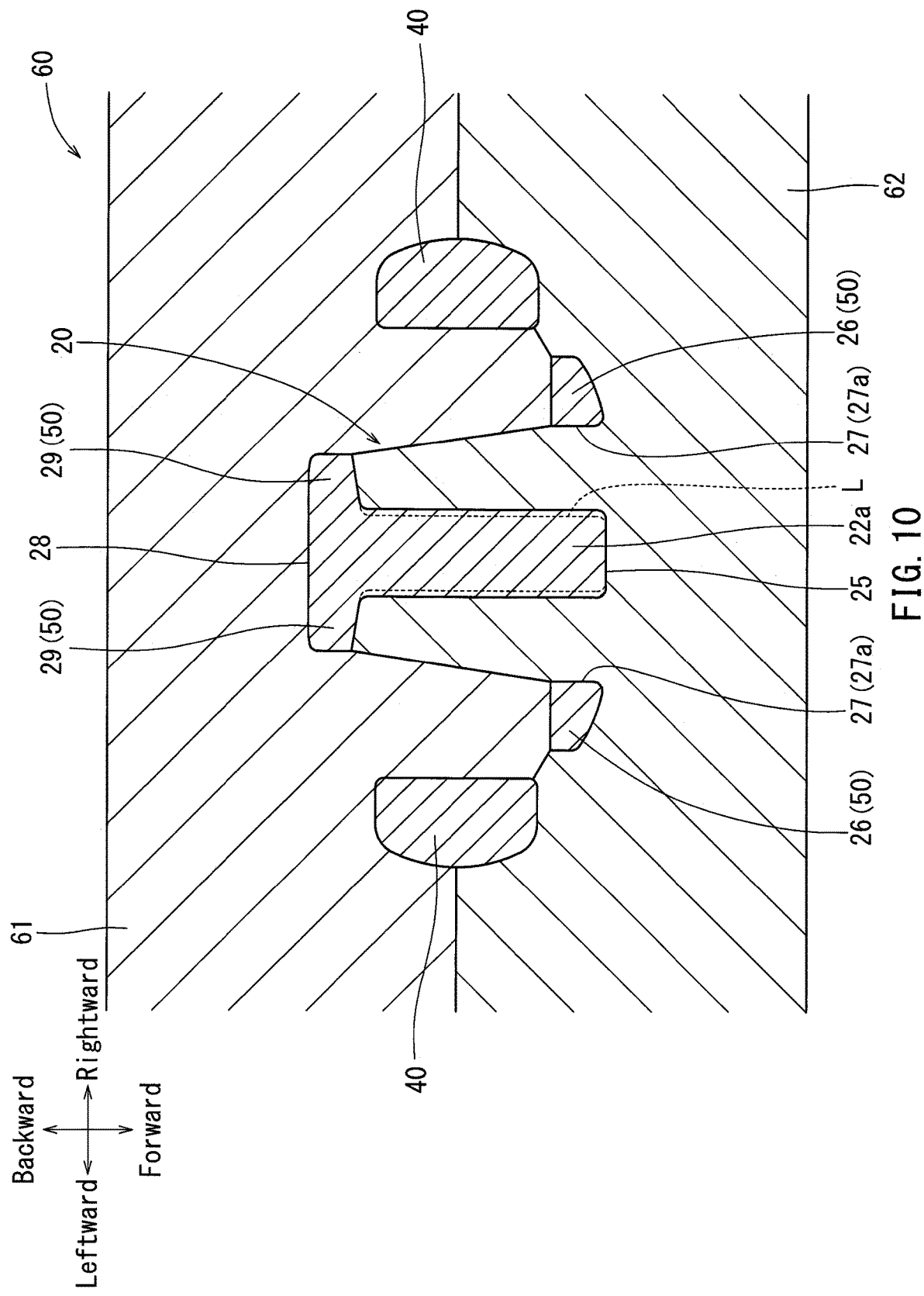
FIG. 10 is a cross-sectional view of a molding die in which the cable tie is being molded.

The cable tie 1 (the attachment base 10 and the anchor 20) thus constructed may be manufactured by injection molding of molten resin using a molding die unit 60 including a first die 61 and a second die 62. Further, as shown in FIG. 10, according to the cable tie 1, the pillar 20 does not include any undercut portions because the pillar 20 has the through bores 27 that may function as die releasing holes during injection molding. Therefore, the cable tie 1 may be easily manufactured using the molding die unit 60.

Figure 11:
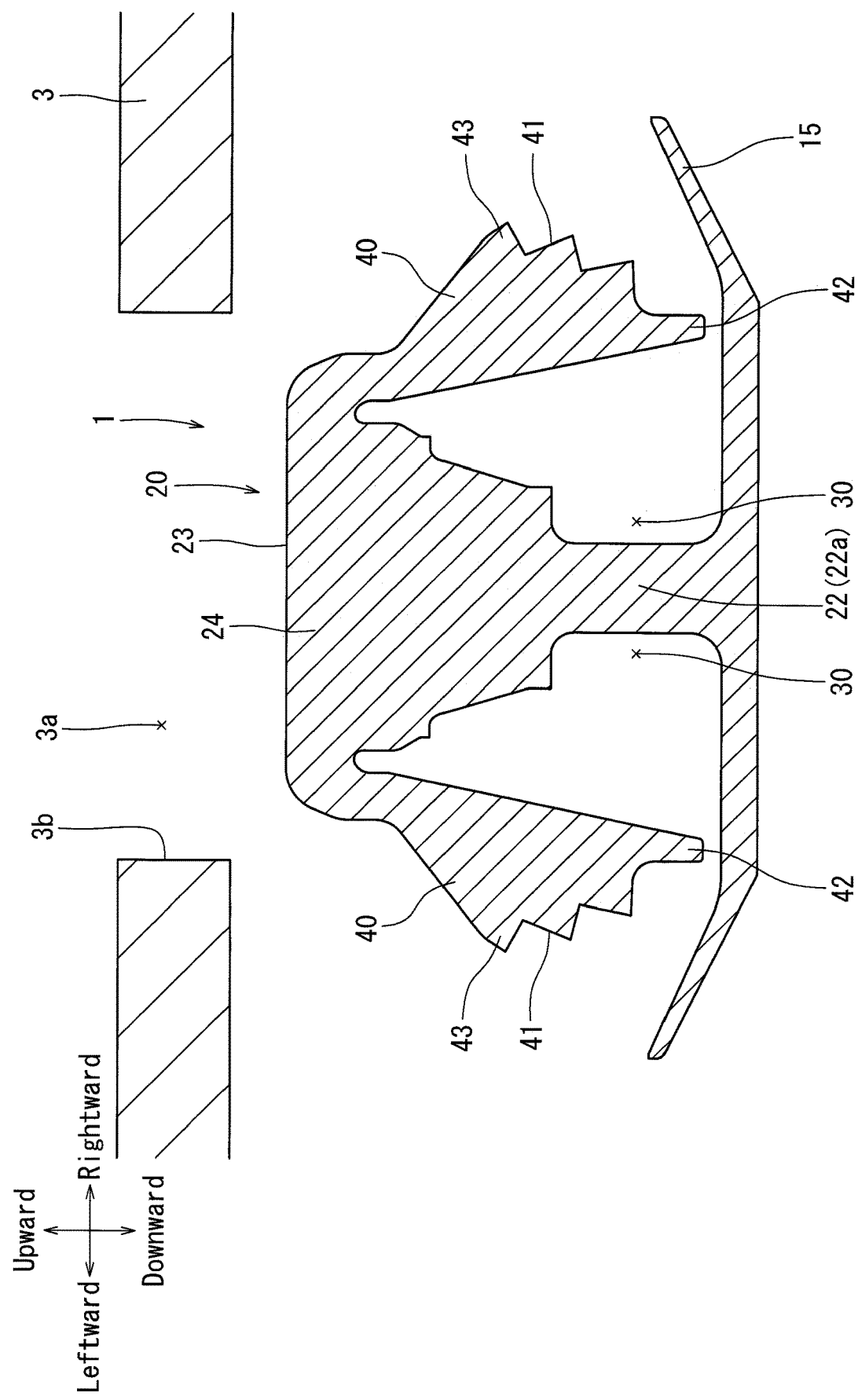
FIG. 11 is an explanatory view of a process for attaching the cable tie to a panel, which shows a condition immediately before the anchor is inserted into an attaching hole formed in the panel.
Figure 12:
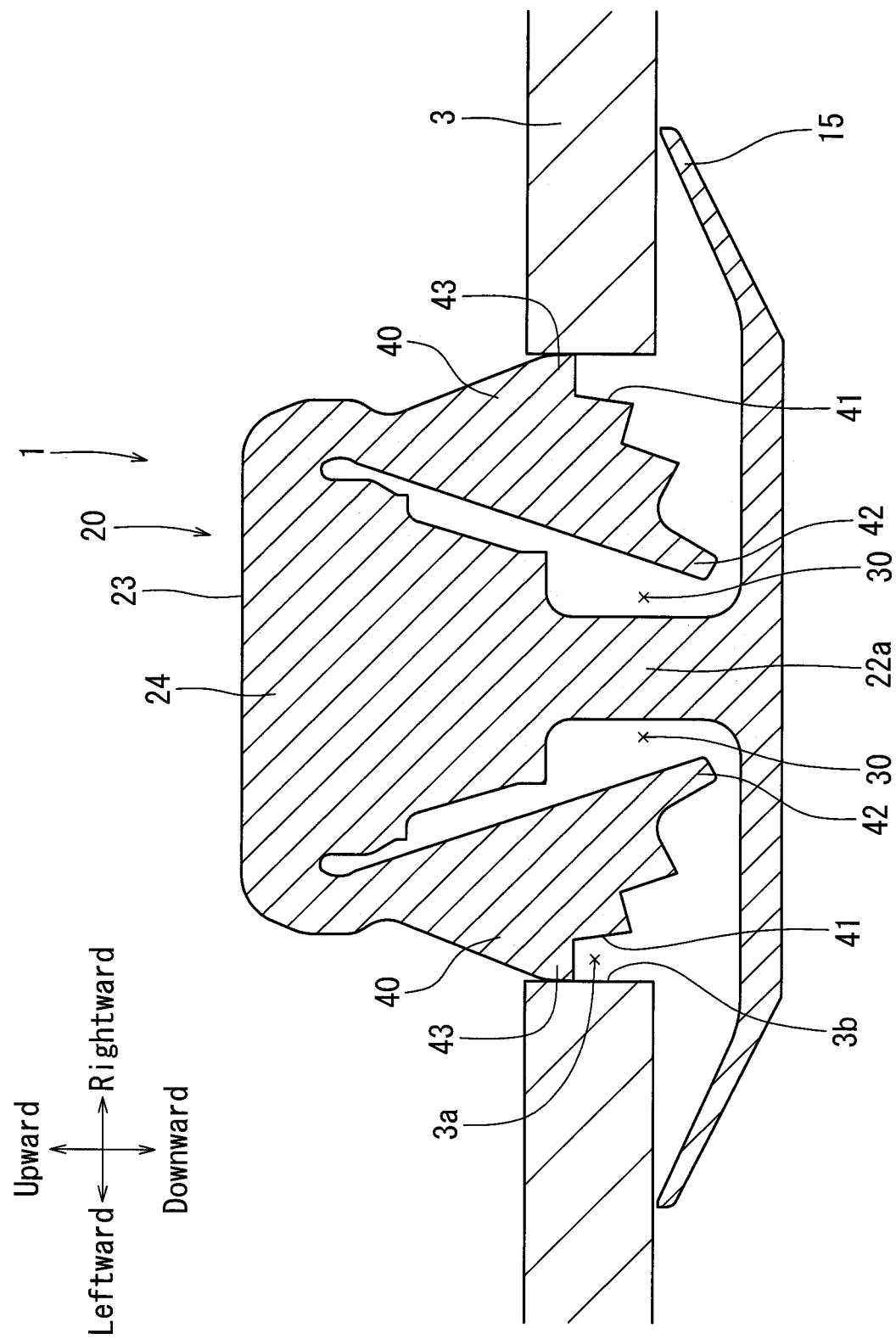
FIG. 12 is an explanatory view of the process for attaching the cable tie to the panel, which shows a condition in which the anchor is being inserted into the attaching hole.

In order to attach the wiring harness 2 to the panel 3, first, the belt 12 of the attachment base 10 is looped and wrapped around the wiring harness, thereby attaching the cable tie 1 to the wiring harness 2. Thereafter, as shown in FIGS. 11 and 12, the anchor 20 is pressed into the attaching hole 3a formed on the panel 3. As a result, the pillar 22 of the anchor 20 is inserted into the attaching hole 3a while the engagement legs 40 are flexed inward toward the base portion 22a of the pillar 22 due to contact of the bulged portions 43 with an inner circumferential surface 3b of the attaching hole 3a (FIG. 12). In other words, the pillar 22 of the anchor 20 is inserted into the attaching hole 3a while the distal ends 42 of the engagement legs 40 enter the concave portions 30 formed on the base portion 22a of the pillar 22. Further, the engagement legs 40 are configured such that the distal ends 42 thereof may not interfere with the pillar 22 (the base portion 22a) when the engagement legs 40 are flexed inward. Therefore, the pillar 22 may be smoothly and easily inserted into the attaching hole 3a of the panel 3.

Figure 13:
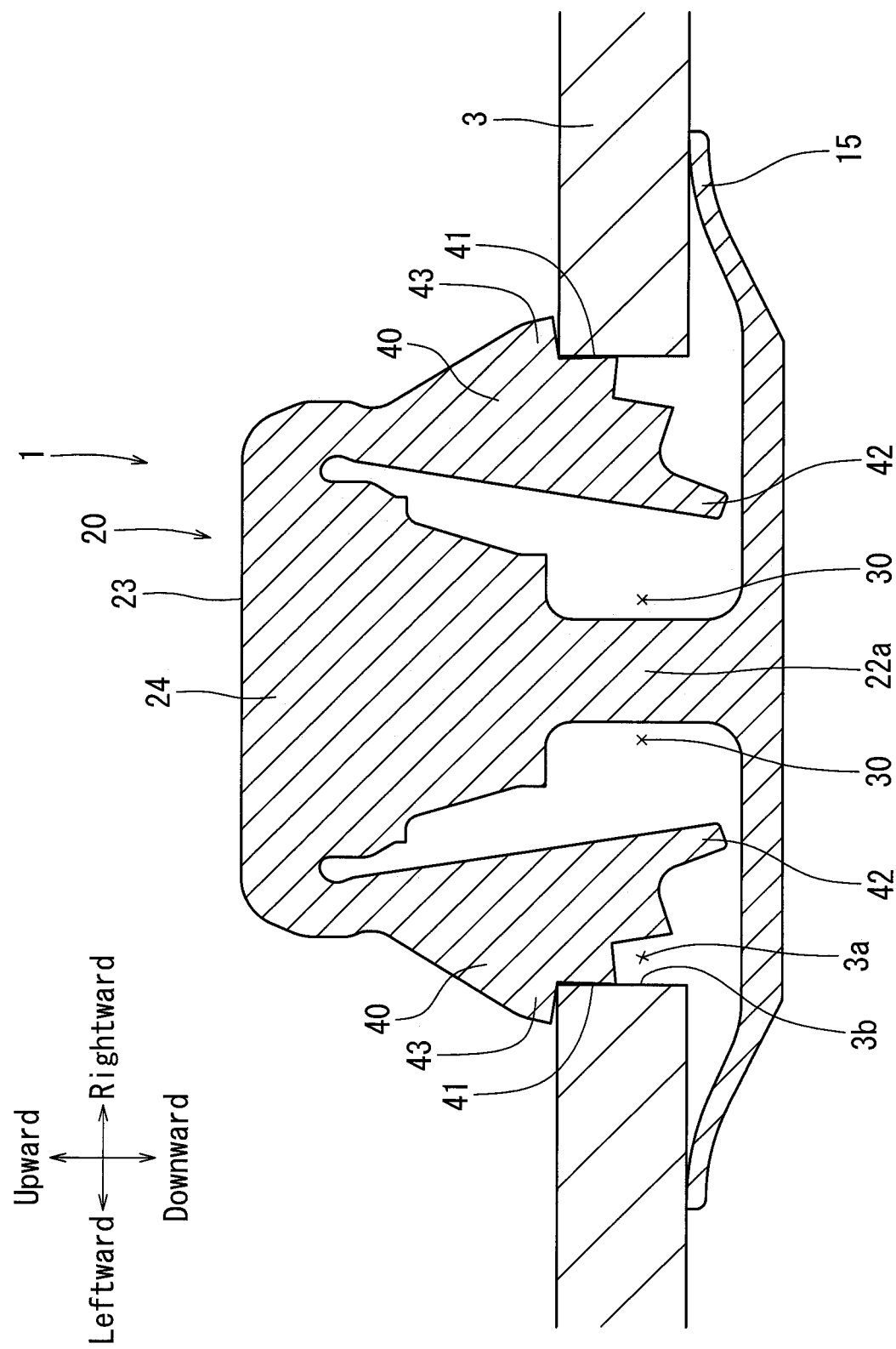
FIG. 13 is an explanatory view of the process for attaching the cable tie to the panel, which shows a condition in which the anchor is completely inserted into the attaching hole so as to be connected to the panel.

As shown in FIG. 13, when the pillar 22 is sufficiently inserted into the attaching hole 3a until the bulged portions 43 pass through the attaching hole 3a, the engagement legs 40 are restored outward, so that engagement claws 41 formed on the engagement legs 40 elastically engage the inner circumferential surface 3b of the attaching hole 3a while the stabilizer 15 of the attachment base 10 closely contact an outer surface of the panel 3. As a result, the anchor 20 can be stably held in the attaching hole 3a with the panel 3 interleaved between the engagement legs 40 and the stabilizer 15. Thus, the cable tie 1 is attached to the panel 3. As a result, the wiring harness 2 can be attached to the panel 3 via the cable tie 1. Further, the stabilizer 15 may elastically contact the outer surface of the panel 3. Therefore, the anchor 20 can be stably retained in the attaching hole 3a even when the panel 3 has various different is varied in thickness.

Figure 14:
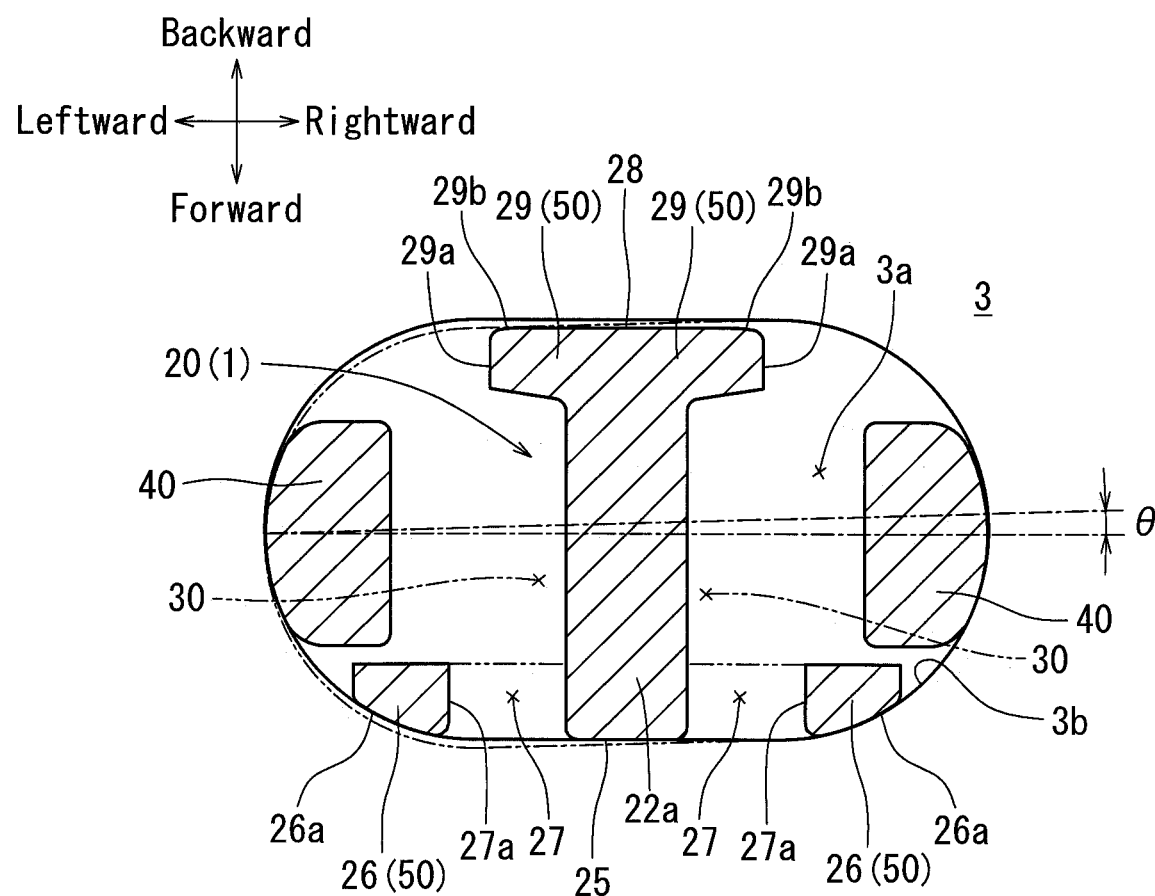
FIG. 14 is a cross-sectional view of the anchor connected to the panel, which view is similar to FIG. 9.
Figure 15:
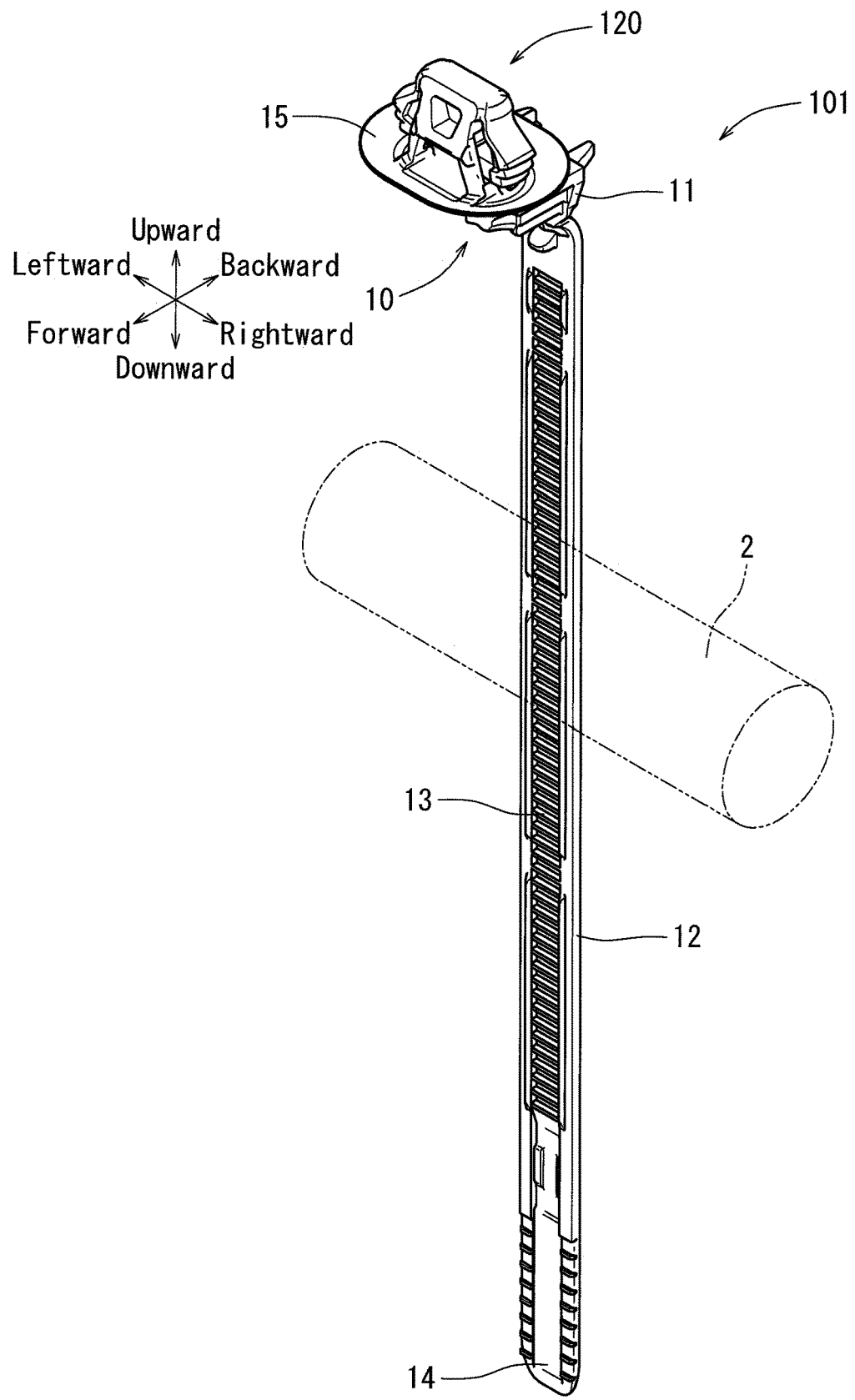
FIG. 15 is a front perspective view of a cable tie according to a second representative embodiment.

As shown in FIG. 14, when the anchor 20 is held in the attaching hole 3a, the outer chamfered edges 26a of the front lateral projections 26 and the outer surfaces 29b of the rear lateral projections 29 may respectively substantially contact the inner circumferential surface 3b of the attaching hole 3a. Therefore, a possible rotation angle θ of the pillar 22 (the anchor 20) relative to the attaching hole 3a may be a couple of degrees (e.g., 3 degrees or less), which are allowable angles. Thus, the anchor 20 may have an excellent anti-rotation property.

Further, in order to increase engaging amounts (forces) of the engagement claws 41 of the engagement legs 40 against the inner circumferential surface 3b of the attaching hole 3a, the engagement legs 40 may be structurally changed. For example, the engagement legs 40 (the bulged portions 43) may be thickened. However, in such a case, when the anchor 20 (the pillar 22) is inserted into the attaching hole 3*a*, the engagement legs 40 may be largely flexed toward the base portion 22*a* of the pillar 22, so that the distal ends 42 of the engagement legs 40 may interfere with the base portion 22*a* of the pillar 22. As a result, an insertion load of the anchor 20 into the attaching hole 3*a* may probably be relatively increased.

As shown by broken lines L in FIG. 9, in order to reduce such an insertion load, the base portion 22*a* of the pillar 22 may be thinned in a range except for the rear end portion 28 (the rear lateral projections 29) of the pillar 22, so as to prevent the engagement legs 40 from interfering with the base portion 22*a* of the pillar 22 when the anchor 20 is inserted into the attaching hole 3*a*. That is, a distance A1 (i.e., a thickness of the base portion 22*a* of the pillar 22) may be reduced (FIG. 9). However, in the pillar 22 thus modified, the rear end portion of the pillar 22 may not be changed. That is, a distance A2 (i.e., a width of the rear end portion 28 of the pillar 22) may not be reduced (FIG. 9). Therefore, a contact area between the rear end portion 28 of the pillar 22 and the inner circumferential surface 3*b* of the attaching hole 3*a* may not be reduced when the anchor 20 is held in the attaching hole 3*a*. As a result, the possible rotation angle θ of the pillar 22 relative to the attaching hole 3*a* may not be relatively changed or increased. In other words, the excellent anti-rotation property of the anchor 20 may substantially be maintained. As shown by broken lines L in FIG. 10, even in the cable tie 1 in which the base portion 22*a* of the pillar 22 is thinned in the range except for the rear end portion 28 of the pillar 22, the pillar 20 does not include any undercut portion. Therefore, the cable tie 1 thus modified may be easily manufactured by slightly modifying the molding die unit 60.

Second Embodiment

Next, a second embodiment will be described in detail with reference to FIGS. 15 to 28. Because the second embodiment relates to the first embodiment, only the constructions and elements that are different from the first embodiment will be explained in detail. Elements that are the same in the first and second embodiments will be identified by the same reference numerals and a detailed description of such elements may be omitted.

Figure 16:
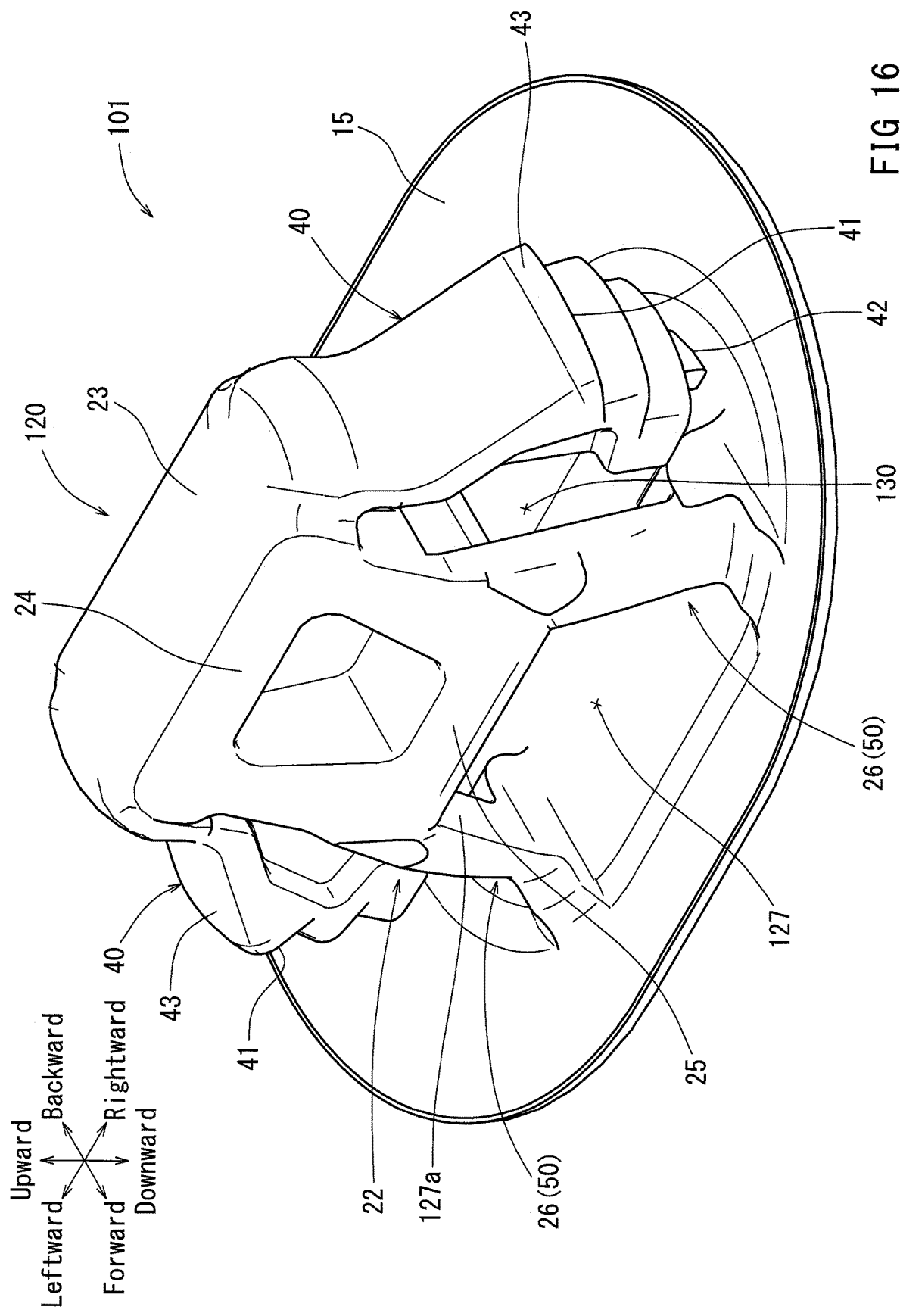
FIG. 16 is an enlarged front perspective view of an anchor and a stabilizer of the cable tie.
Figure 17:
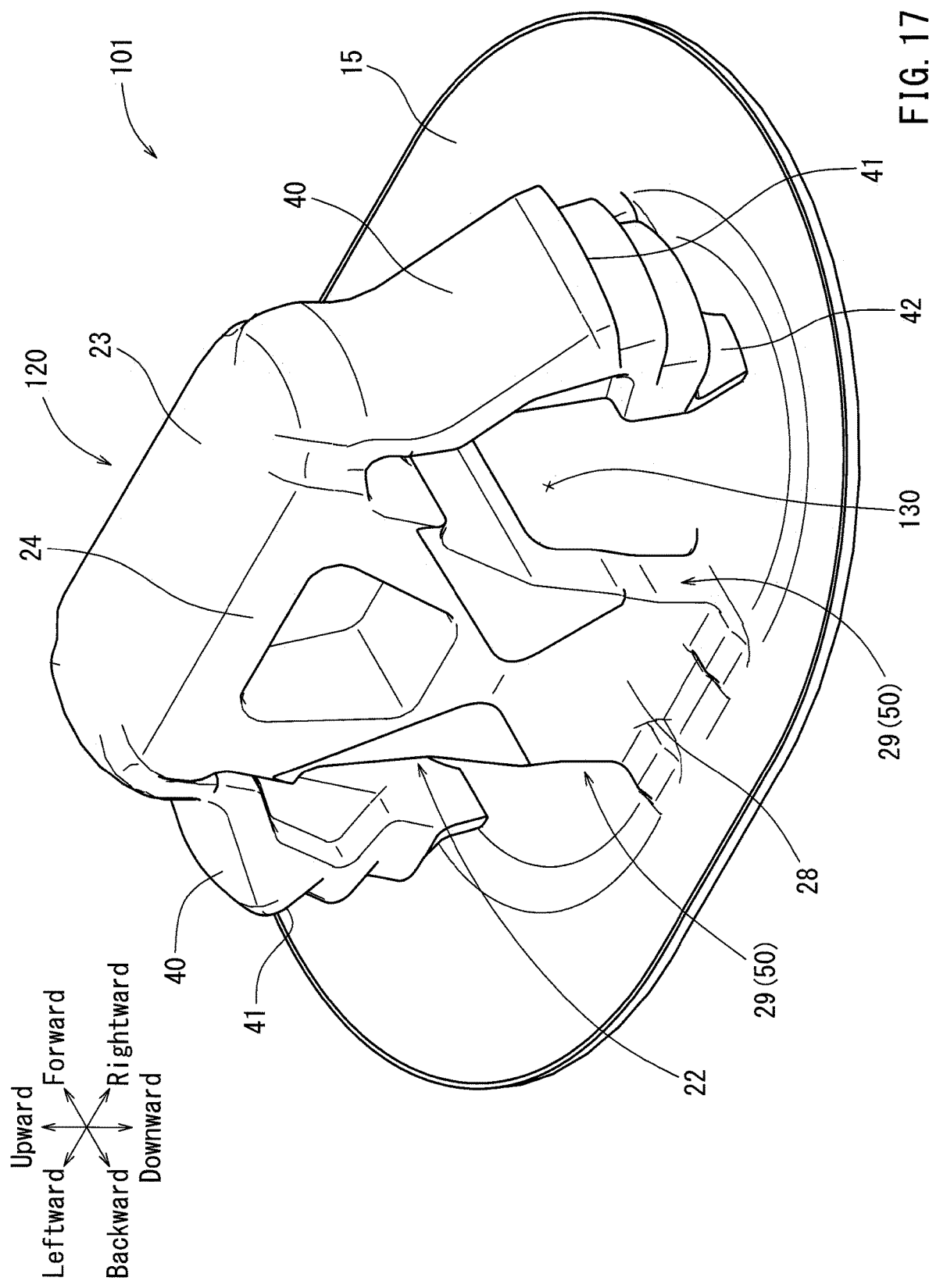
FIG. 17 is an enlarged rear perspective view of the anchor and the stabilizer of the cable tie.
Figure 18:
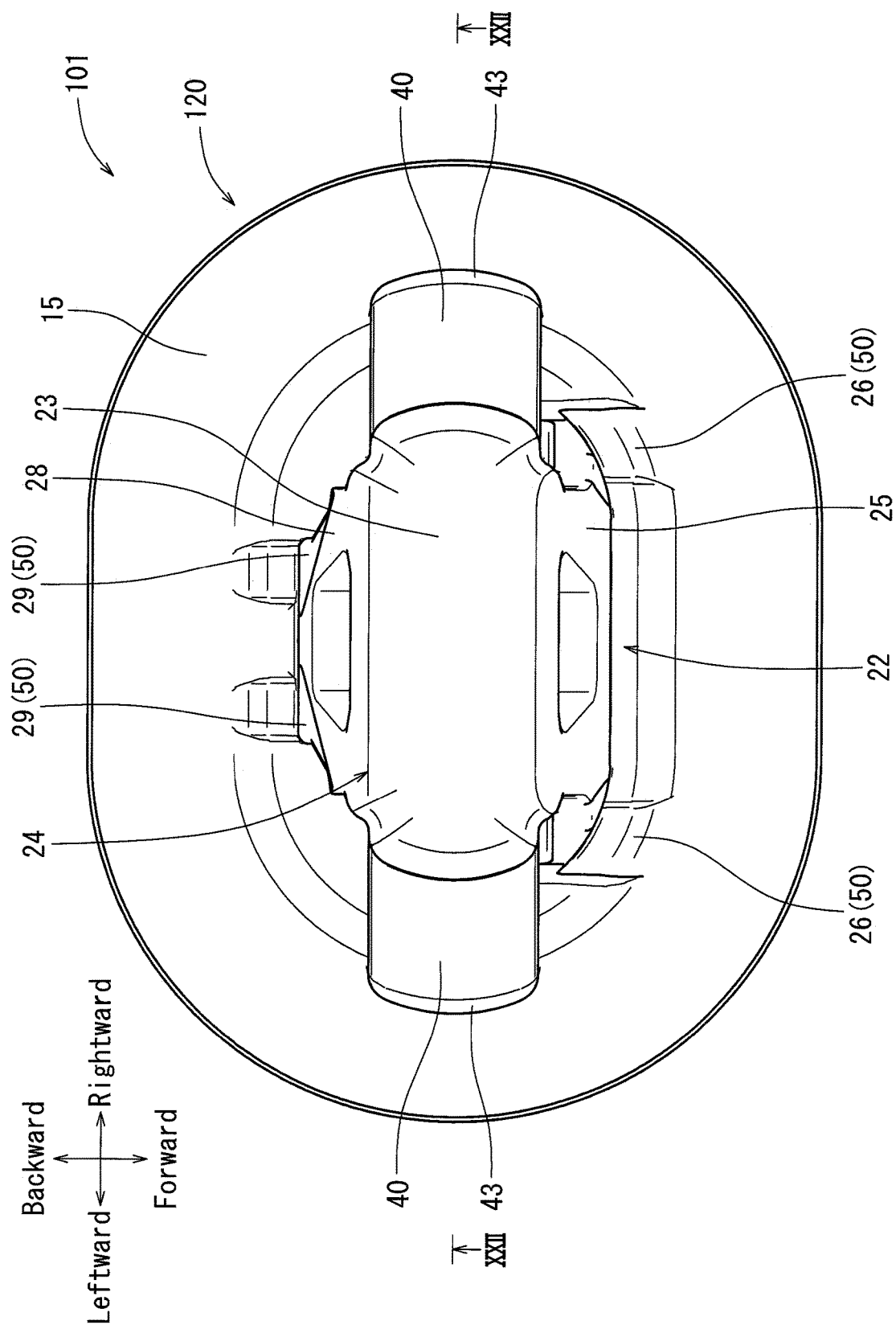
FIG. 18 is a plan view of FIG. 16.
Figure 19:
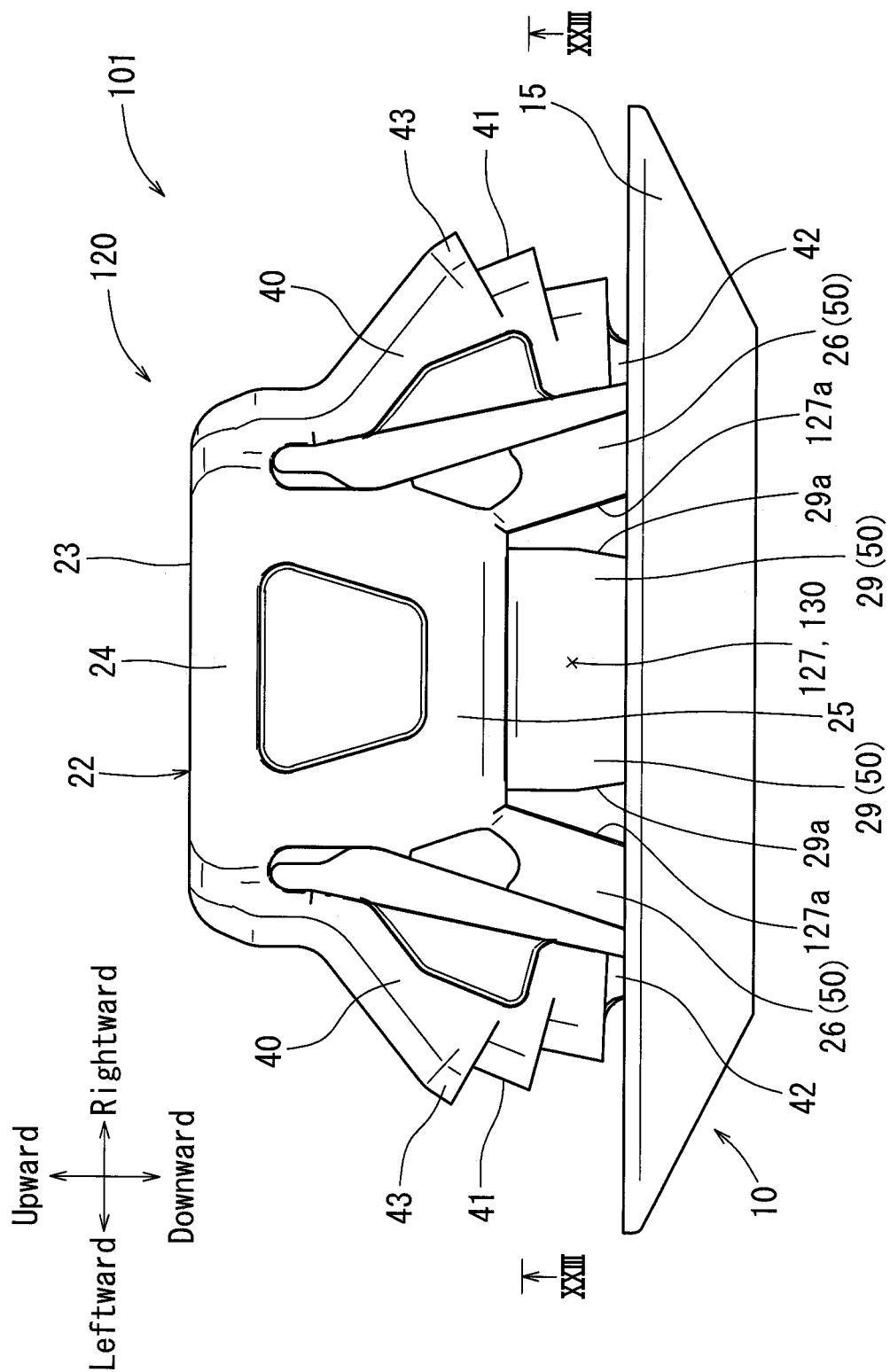
FIG. 19 is a front elevational view of FIG. 16.
Figure 20:
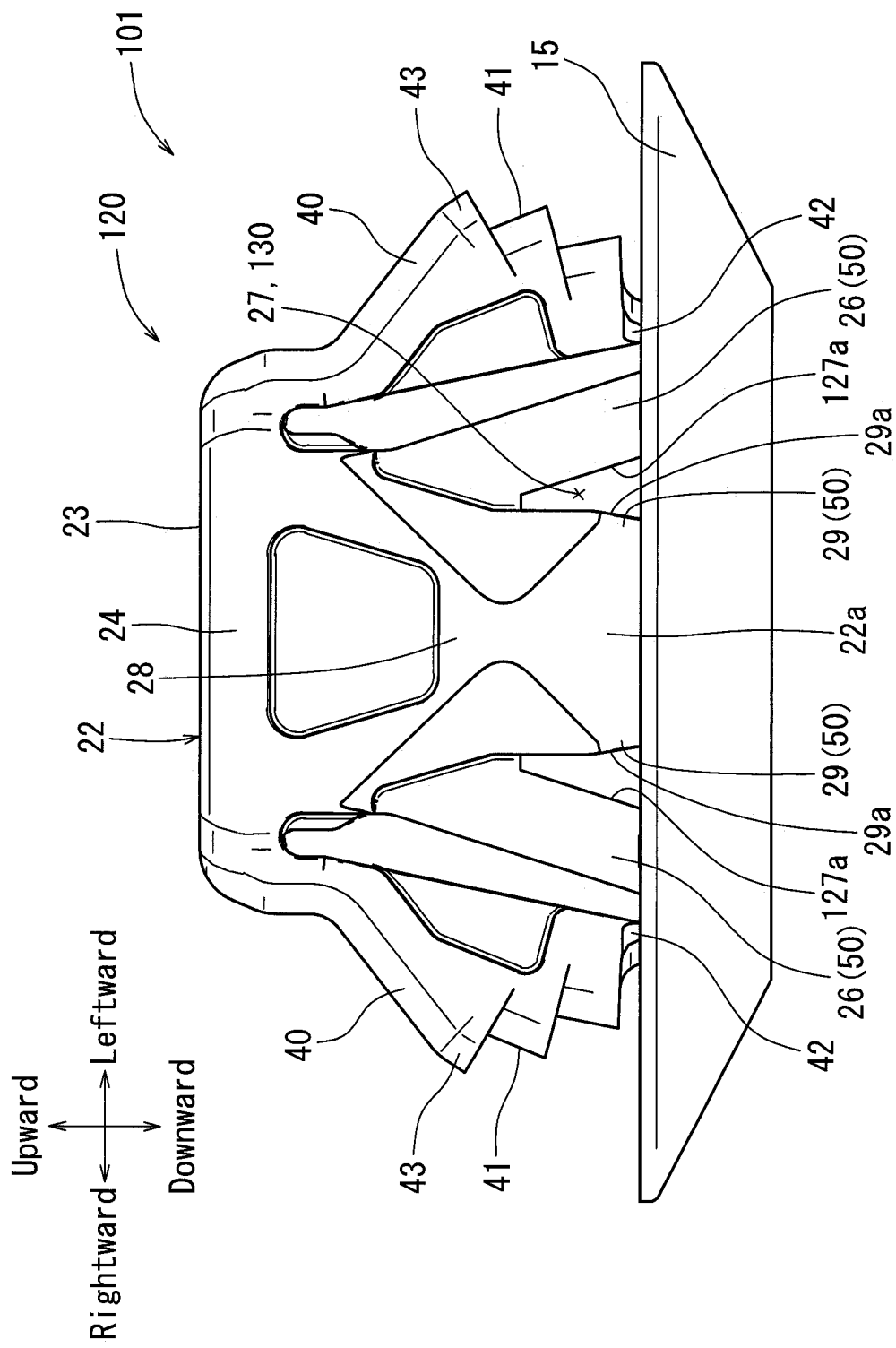
FIG. 20 is a rear elevational view of FIG. 16.
Figure 21:
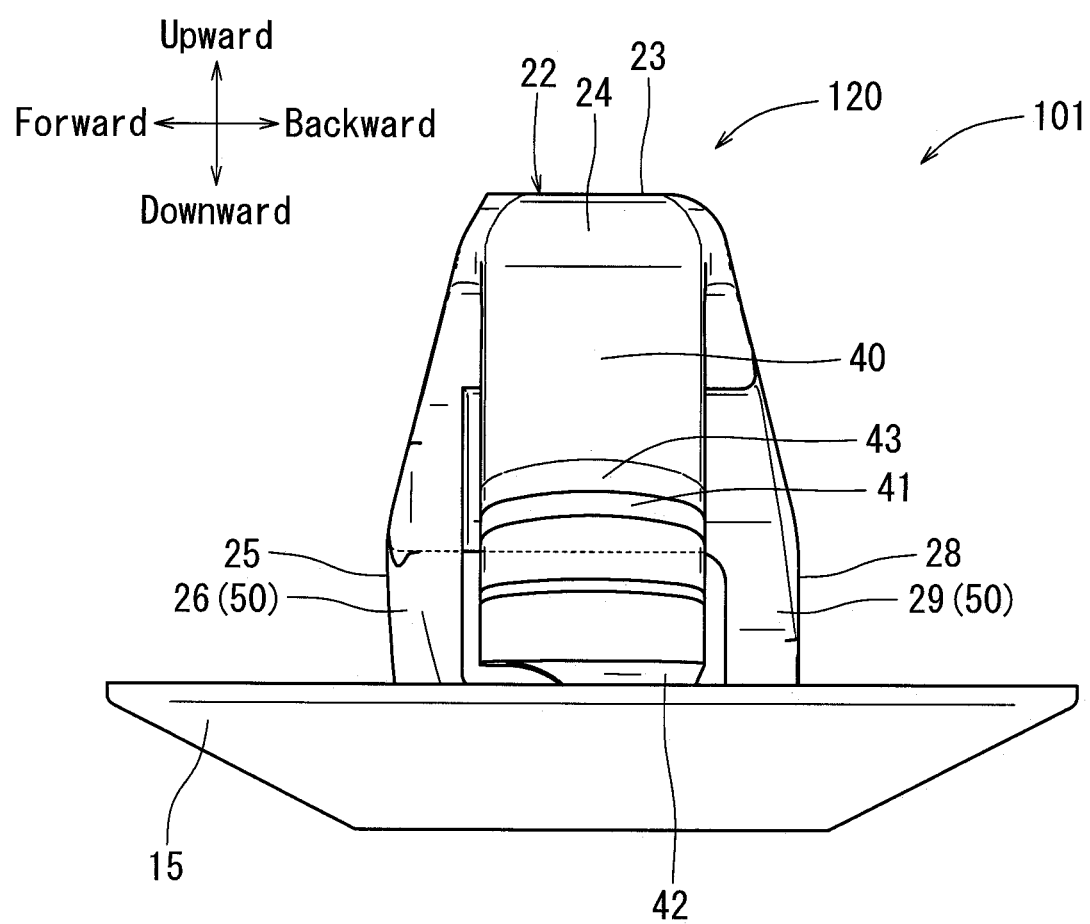
FIG. 21 is a right side view of FIG. 16.
Figure 22:
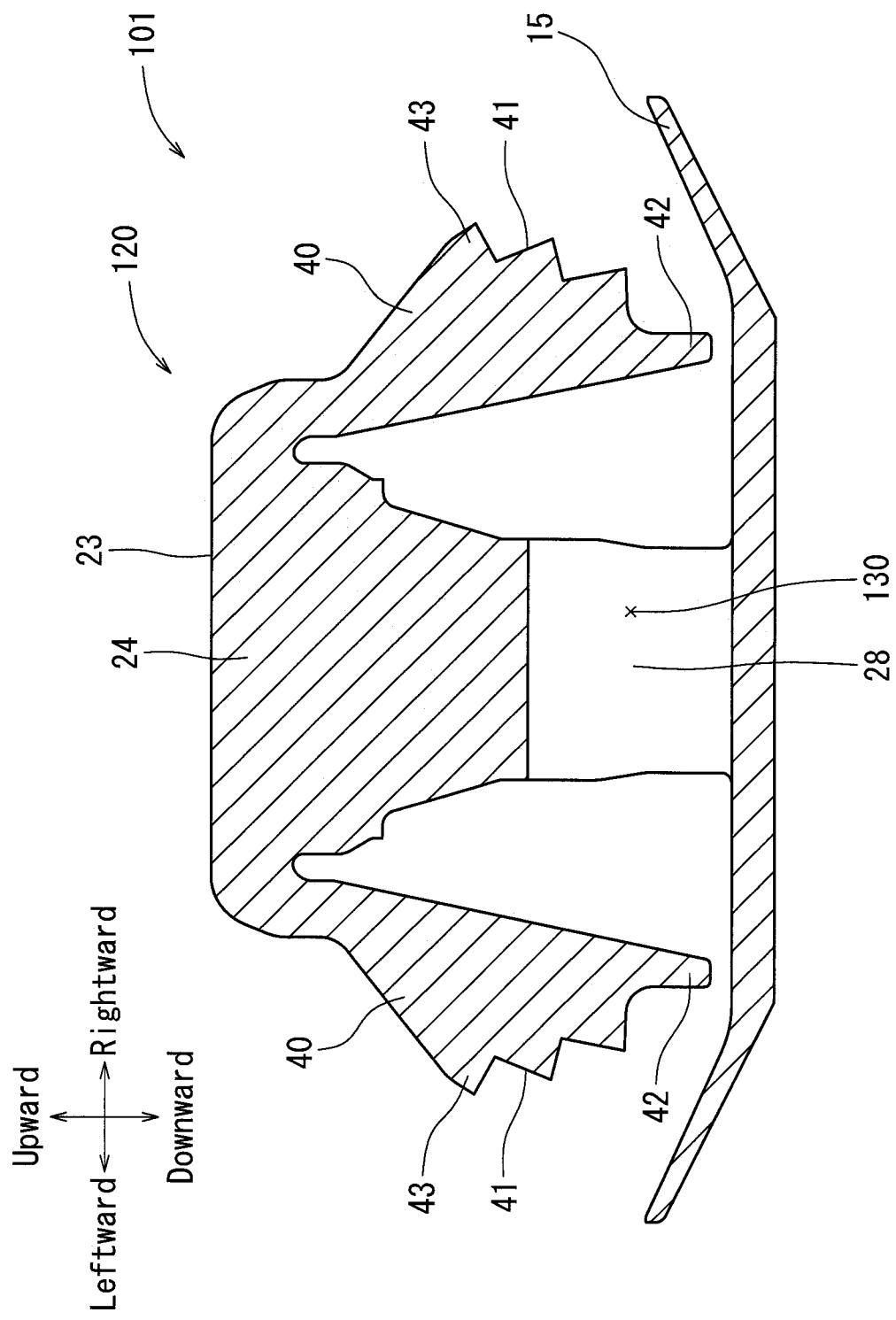
FIG. 22 is a cross-sectional view taken along line XXII-XXII in FIG. 18.
Figure 23:
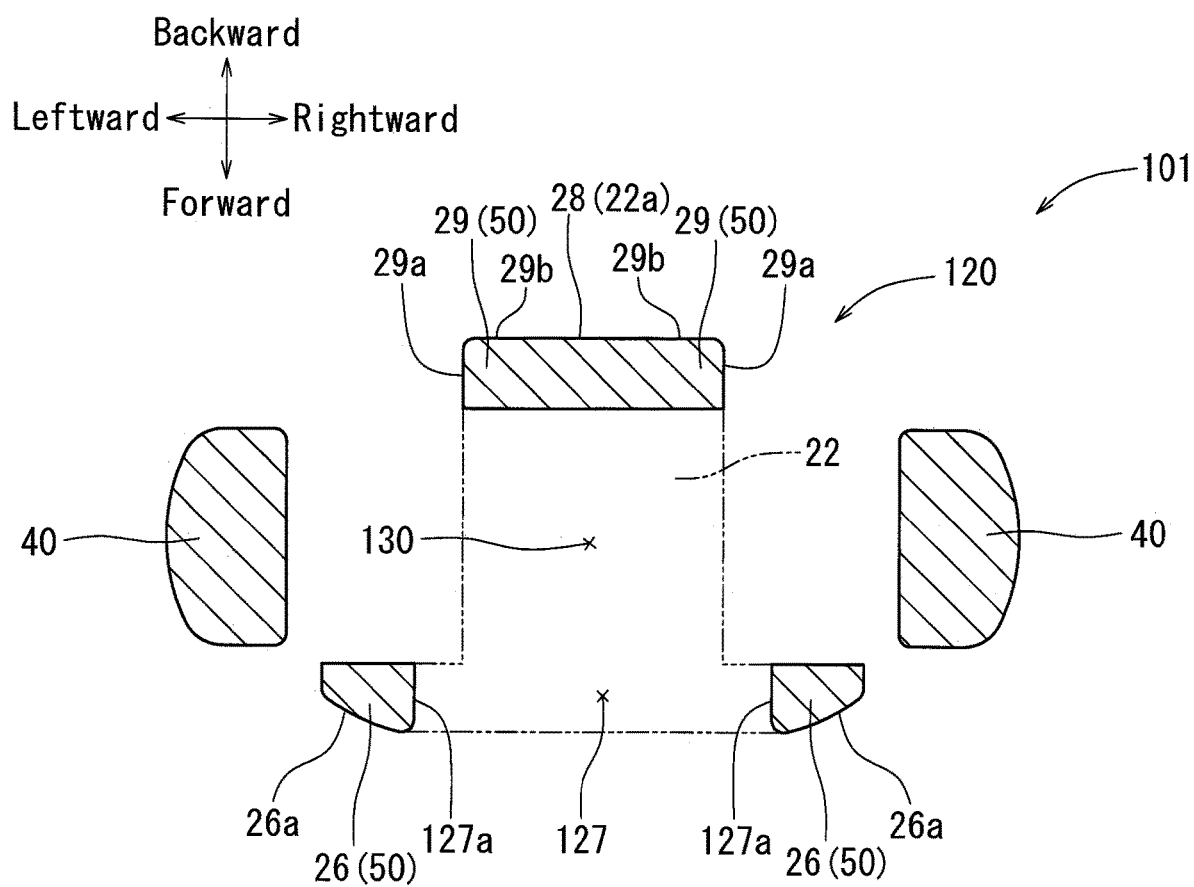
FIG. 23 is a cross-sectional view taken along line XXIII-XXIII in FIG. 19.
Figure 24:
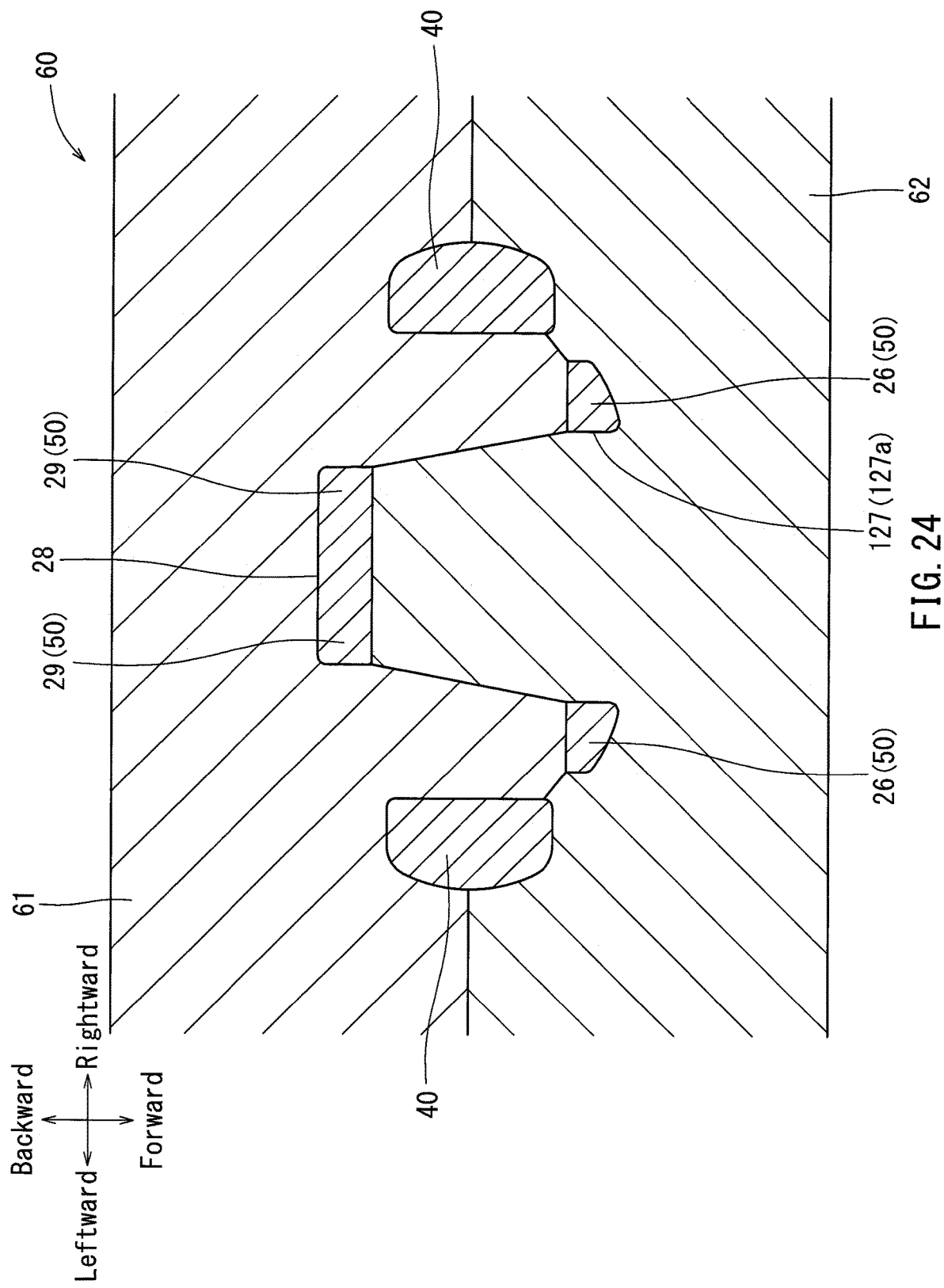
FIG. 24 is a cross-sectional view of a molding die in which the cable tie is being molded.
Figure 25:
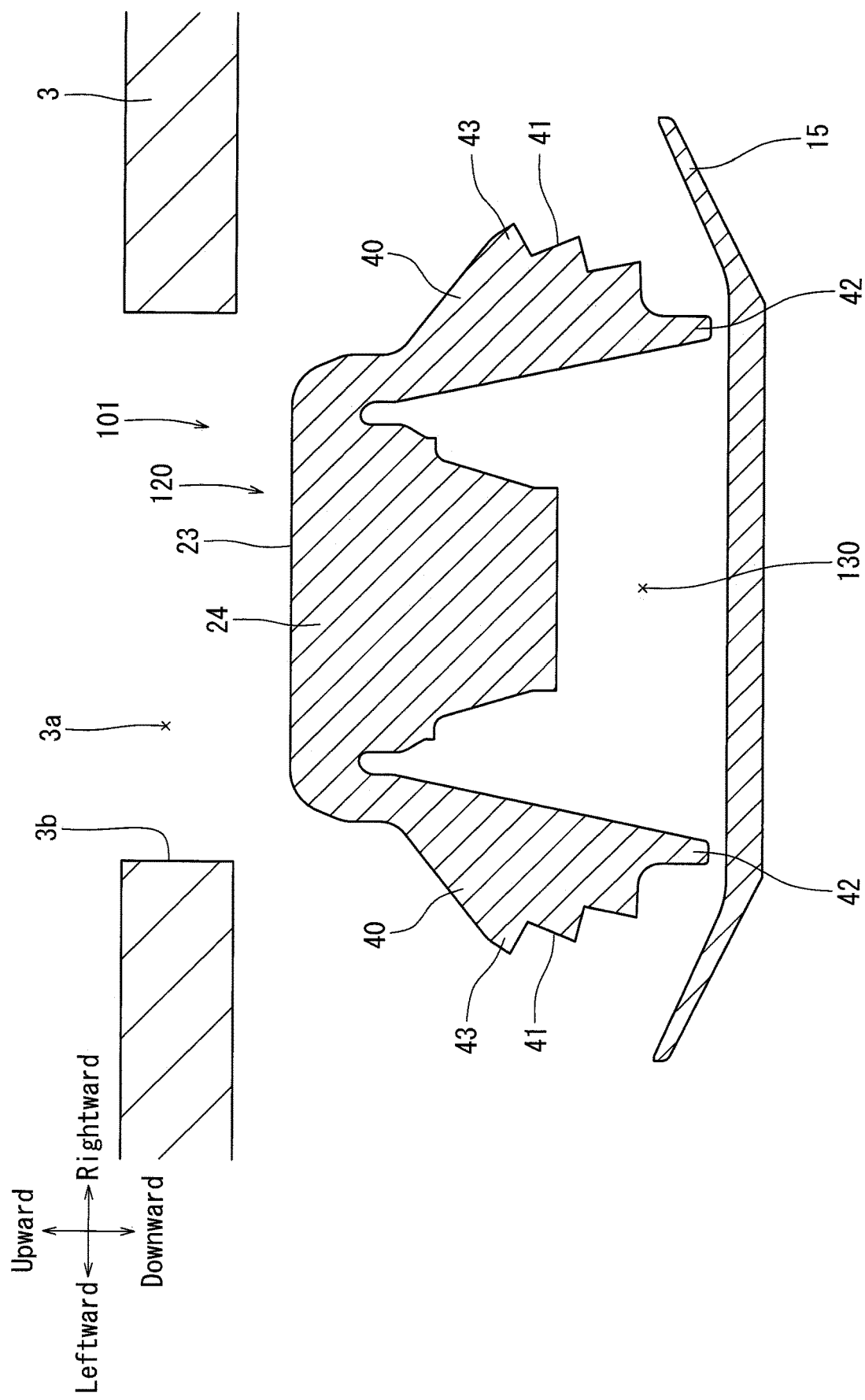
FIG. 25 is an explanatory view of a process for attaching the cable tie to a panel, which shows a condition immediately before the anchor is inserted into an attaching hole formed in the panel.
Figure 26:
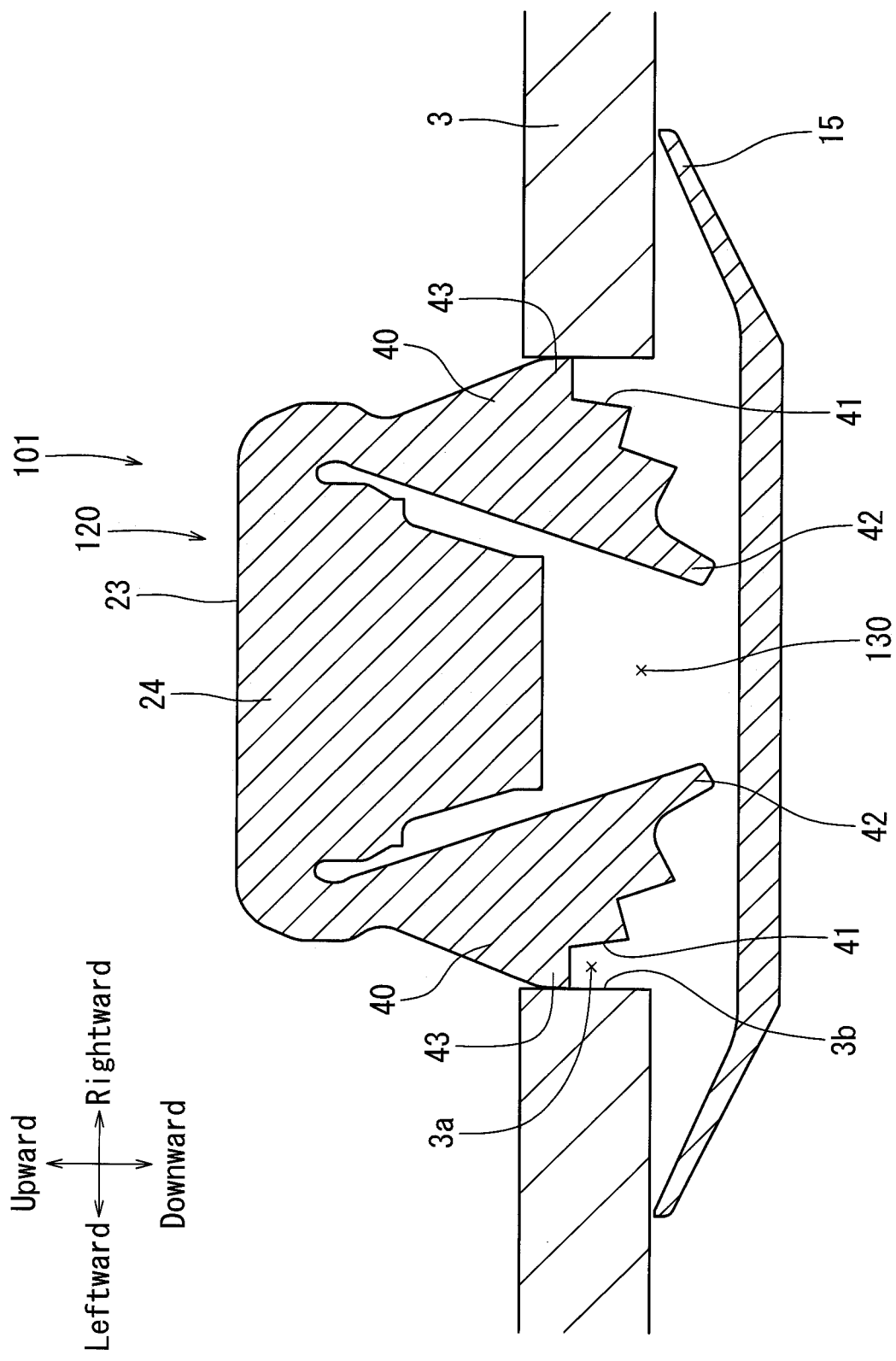
FIG. 26 is an explanatory view of the process for attaching the cable tie to the panel, which shows a condition in which the anchor is being inserted into the attaching hole.
Figure 27:
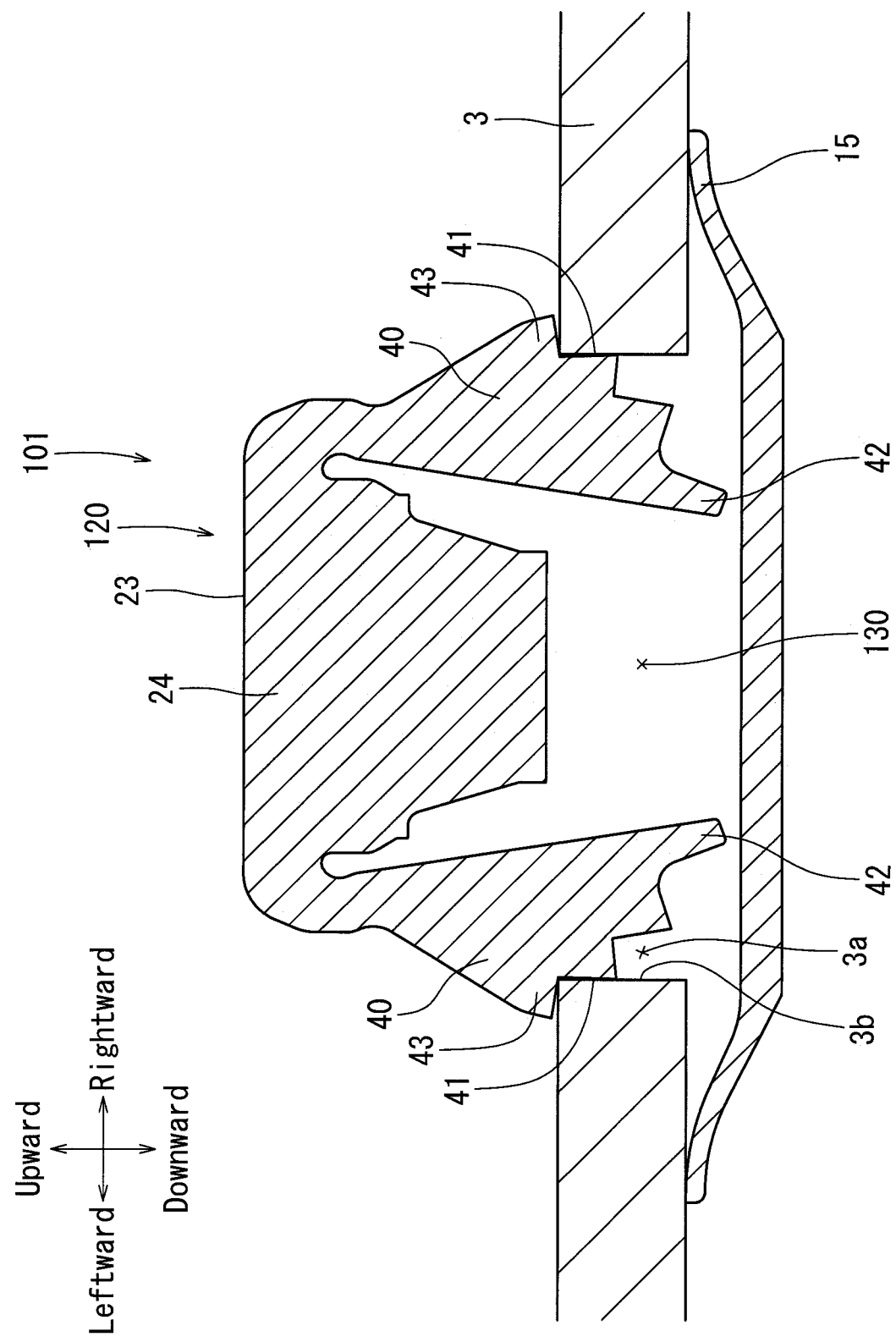
FIG. 27 is an explanatory view of the process for attaching the cable tie to the panel, which shows a condition in which the anchor is completely inserted into the attaching hole so as to be connected to the panel.
Figure 28:
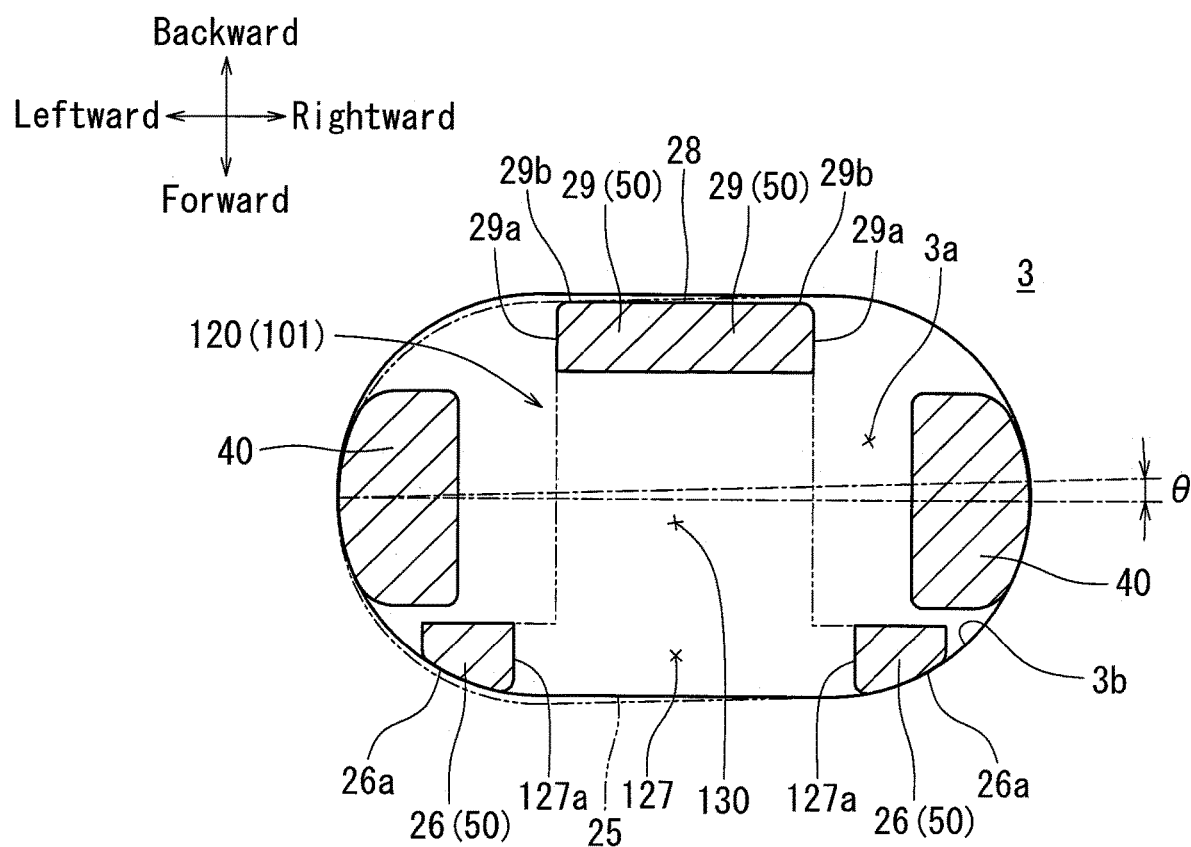
FIG. 28 is a cross-sectional view of the anchor connected to the panel, which view is similar to FIG. 9.
Figure 29:
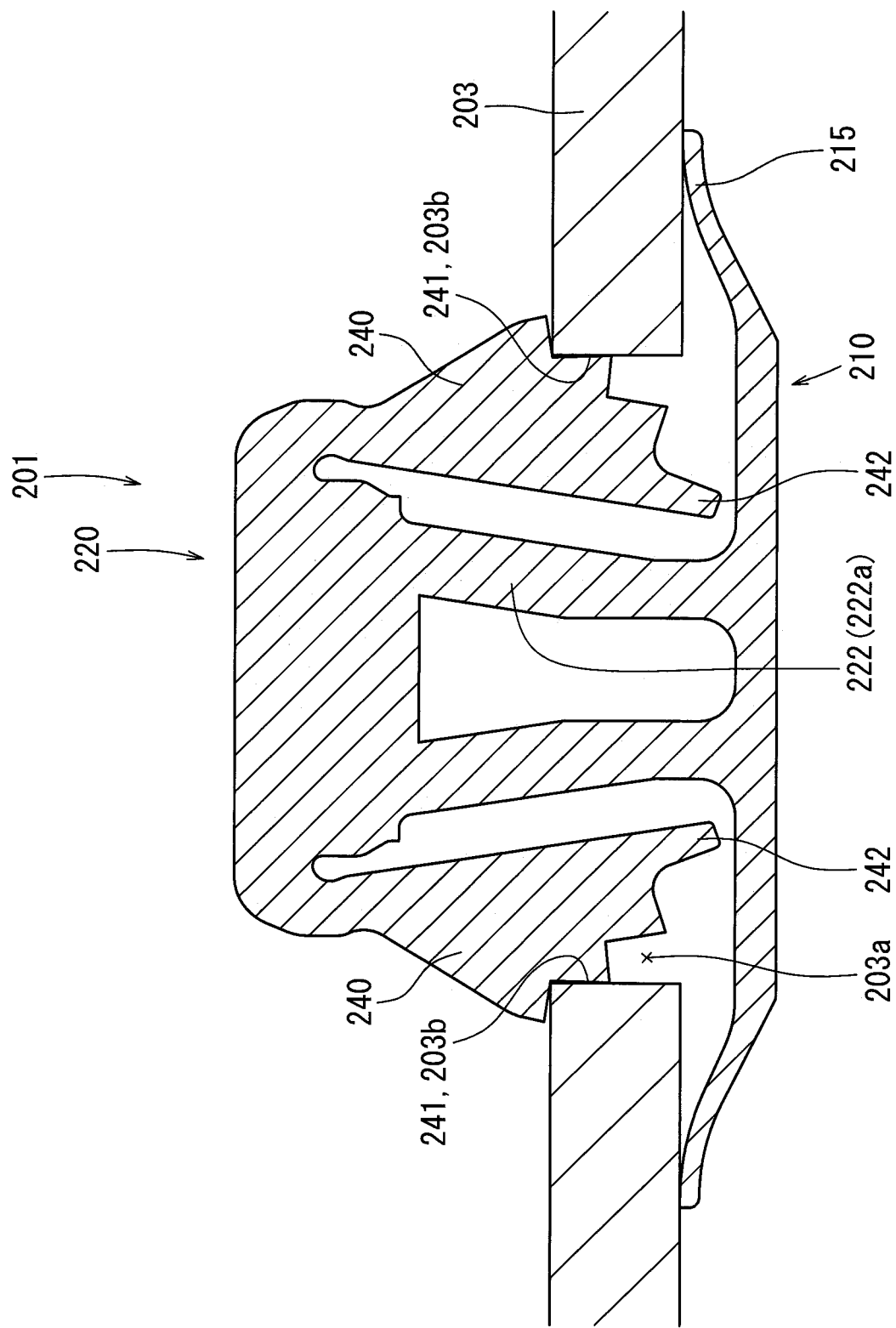
FIG. 29 is a view of a conventional cable tie, which shows a condition in which an anchor is connected to a panel.
Figure 30:
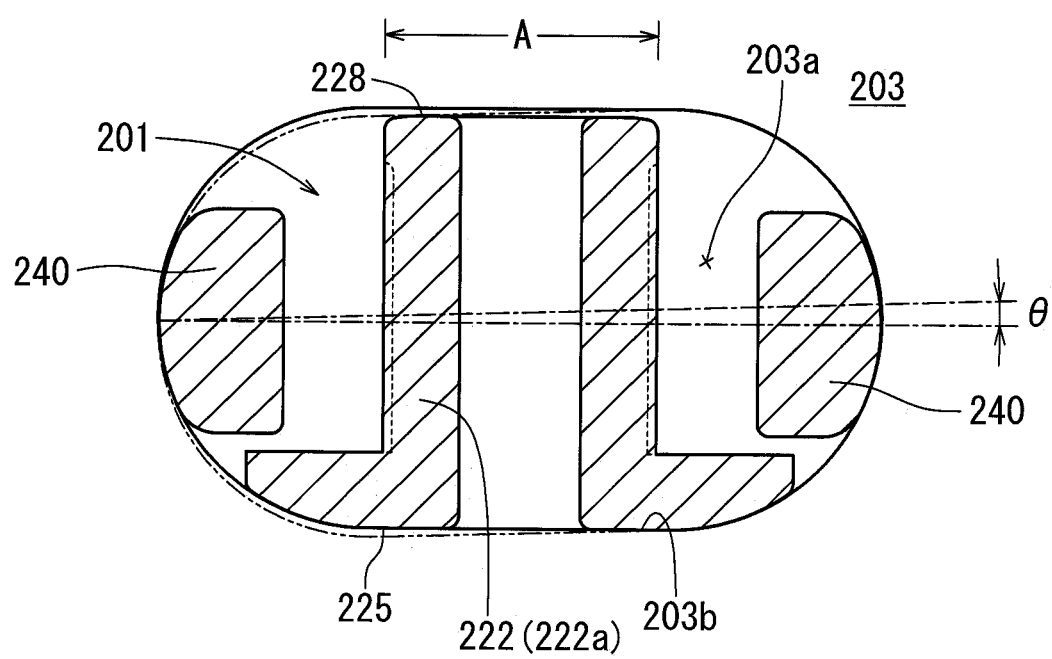
FIG. 30 is a cross-sectional view of the anchor connected to the panel, which view is similar to FIGS. 14 and 28.
Figure 31:
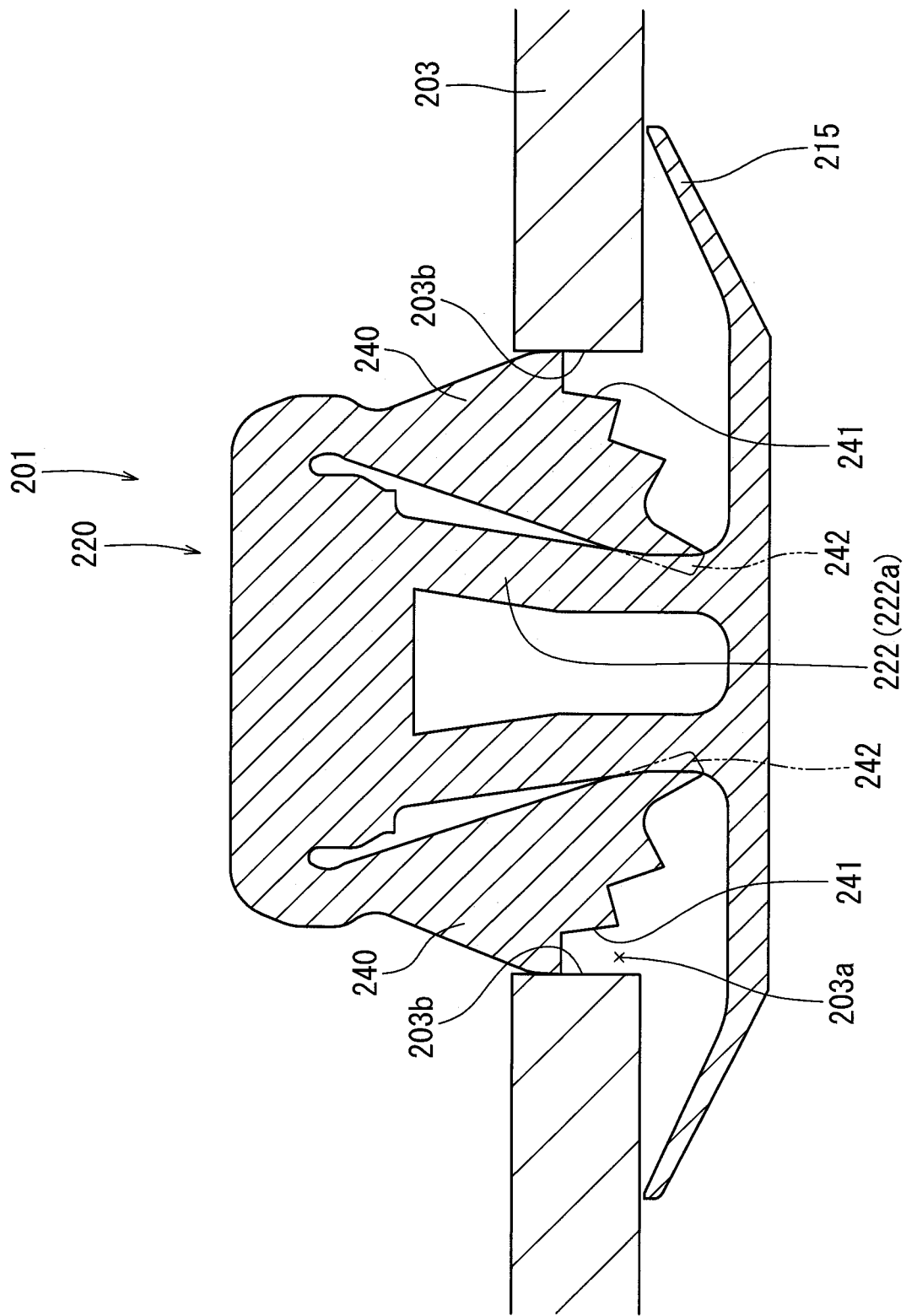
FIG. 31 is an explanatory view of a process for attaching the cable tie to the panel, which shows a condition in which the anchor is being inserted into an attaching hole formed in the panel.

The cable tie 101 according to the second embodiment may be different from the cable tie 1 of the first embodiment in that the cable tie 101 may include an anchor 120 that is different from the anchor 20. In particular, in the anchor 120, similar to the first embodiment, the front end portion 25 of the pillar 22 may have a pair of substantially rectangular through bores (not labeled) that are respectively formed on the front lateral projections 26. Further, unlike the first embodiment, the base portion 22*a* of the pillar 22 may substantially be omitted in a range except for the rear end portion 28 of the pillar 22. As a result, as shown in FIGS. 16, 19 and 23, the through bores formed on the front lateral projections 26 may be combined or merged into a single substantially rectangular through bore 127 having laterally outermost inner surfaces 127*a*. Further, because the base portion 22*a* may substantially be omitted from the pillar 22, the pillar 22 may have an open space or cavity 130 formed therein instead of the right and left concave portions 30 in the first embodiment. The cavity 130 may fully open laterally (right and left) and forward.

The cable tie 101 thus constructed may function in the same manner as the cable tie 1 of the first embodiment. However, according to the cable tie 101, the base portion 22*a* of the pillar 22 may substantially be omitted, so that the pillar 22 may have the cavity 130. Therefore, even when the engagement legs 40 may be largely flexed toward the pillar 22, the distal ends 42 of the engagement legs 40 may never interfere with the pillar 22 (the base portion 22*a*). This means that even when the engagement legs 40 may be structurally changed in order to increase the engaging amounts of the engagement claws 41 of the engagement legs 40 against the inner circumferential surface 3*b* of the attaching hole 3*a*, the pillar 22 needs not be changed.

Naturally, various changes and modifications may be made to the first and second embodiments. For example, in the embodiments, the cable tie 1 and 101, the wiring harness 2 and the panel 3 are respectively exemplified as the clip, the attaching article and the object member. However, the clip may be various fastening devices. Further, the attaching article may be various cables, hoses and tubes.

Further, the base portion 22*a* of the pillar 22 is formed as a single member. However, the base portion 22*a* may be a plurality of (two or three) members. Further, each of the pair of front lateral projections 26 and the pair of relar lateral projections 29 formed on the pillar 22 may be a single projection.

Representative examples of the present disclosure have been described in detail with reference to the attached drawings. This detailed description is merely intended to teach a person of skill in the art further details for practicing preferred aspects of the present disclosure and is not intended to limit the scope of the disclosure. Only the claims define the scope of the claimed disclosure. Therefore, combinations of features and steps disclosed in the foregoing detail description may not be necessary to practice the disclosure in the broadest sense, and are instead taught merely to particularly describe detailed representative examples of the disclosure. Moreover, the various features taught in this specification may be combined in ways that are not specifically enumerated in order to obtain additional useful embodiments of the present disclosure.

What is claimed is:

1. A clip comprising an attachment base to which an attaching article is attached, and an anchor including a pillar formed on the attachment base and a pair of engagement legs formed on the pillar, in which the clip is configured such that when the anchor is inserted into an attaching hole formed on an object member while the pair of engagement legs are flexed, the anchor is held in the attaching hole with the object member interleaved between the pair of engagement legs and the attachment base, so that the attaching article is attached to the object member, wherein the clip further comprises a rotation preventive mechanism that is configured to prevent the pillar from rotating relative to the attaching hole in a condition in which the anchor is held in the attaching hole, wherein the rotation preventive mechanism includes a pair of projections formed on one end portion of the pillar and oppositely projected therefrom, and at least one projection formed on another of the end portion of the pillar, wherein the one end portion of the pillar has through bores respectively formed on the pair of projections formed thereon, and wherein the at least one projection formed on another of the end portion of the pillar is configured such that a distal end surface thereof does not extend outward beyond outermost inner surfaces of the through bores formed on the pair of projections formed on the one end portion of the pillar.

2. The clip as described in claim 1, wherein the pillar has engagement leg receiving portions which allow distal ends of the engagement legs to enter when the anchor is inserted into the attaching hole.

3. The clip as described in claim 2, wherein the engagement leg receiving portions are concave portions formed on the pillar.

4. A clip comprising:
an attachment base to which an attaching article is attached; and
an anchor including a pillar formed on the attachment base and a pair of engagement legs formed on the pillar,
wherein the pillar includes a pair of first projections formed on one end portion of the pillar and oppositely projected therefrom,
wherein the pillar includes a base portion connected to the attachment base, and
wherein the one end portion of the pillar has through bores respectively formed on the first projections formed thereon and extending along the base portion of the pillar.

5. The clip as described in claim 4, wherein the pillar includes at least one second projection formed on another of the end portion of the pillar, and wherein the second projection of the pillar is configured such that a distal end surface thereof does not extend outward beyond outermost inner surfaces of the through bores formed on the first projections of the pillar.

6. The clip as described in claim 4, wherein the base portion of the pillar are omitted in a range except for another of the end portion of the pillar, and wherein the through bores formed on the first projections of the pillar are integrated with each other, so as to be formed into a single through bore.

* * * * *